United States Patent
Ji et al.

(10) Patent No.: US 12,197,748 B2
(45) Date of Patent: Jan. 14, 2025

(54) STORAGE DEVICE AND OPERATION METHOD OF ELECTRONIC SYSTEM

(71) Applicant: SAMSUNG ELECTRONICS CO., LTD., Suwon-si (KR)

(72) Inventors: Younghyun Ji, Hwaseong-si (KR); Jisoo Kim, Seongnam-si (KR); Kyungwoo Noh, Yongin-si (KR); Kyungjin Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 188 days.

(21) Appl. No.: 17/946,650

(22) Filed: Sep. 16, 2022

(65) Prior Publication Data

US 2023/0195333 A1    Jun. 22, 2023

(30) Foreign Application Priority Data

Dec. 17, 2021   (KR) .......................... 10-2021-0181442

(51) Int. Cl.
*G06F 12/00*    (2006.01)
*G06F 3/06*    (2006.01)

(52) U.S. Cl.
CPC .......... *G06F 3/0623* (2013.01); *G06F 3/0652* (2013.01); *G06F 3/0679* (2013.01)

(58) Field of Classification Search
CPC ..... G06F 3/0623; G06F 3/0652; G06F 3/0679
See application file for complete search history.

(56) References Cited

U.S. PATENT DOCUMENTS

| | | | |
|---|---|---|---|
| 7,679,133 B2 | 3/2010 | Son et al. | |
| 8,553,466 B2 | 10/2013 | Han et al. | |
| 8,559,235 B2 | 10/2013 | Yoon et al. | |
| 8,654,587 B2 | 2/2014 | Yoon et al. | |
| 8,909,888 B2 | 12/2014 | Goss et al. | |
| 9,436,831 B2 | 9/2016 | Ellis et al. | |
| 9,990,382 B1 | 6/2018 | Dias | |
| 10,817,211 B2 | 10/2020 | Casperson et al. | |
| 10,891,225 B2 | 1/2021 | McVay et al. | |
| 2005/0248993 A1 | 11/2005 | Lee et al. | |
| 2010/0214850 A1 | 8/2010 | Hosono | |
| 2011/0233648 A1 | 9/2011 | Seol et al. | |
| 2012/0278564 A1 | 11/2012 | Goss et al. | |
| 2014/0129761 A1* | 5/2014 | Kwon ................. | G06F 12/0246 711/103 |
| 2014/0281173 A1* | 9/2014 | Im ........................ | G06F 3/0631 711/103 |

(Continued)

*Primary Examiner* — David Yi
*Assistant Examiner* — Tahilba O Puche
(74) *Attorney, Agent, or Firm* — Sughrue Mion, PLLC

(57) ABSTRACT

A storage device includes a memory device including user memory blocks providing a user data region; and a controller configured to: map logical addresses used in a host to a portion of the user data region, and use a remaining portion of the user data region as an over-provisioning region, wherein the controller is further configured to control the memory device to: erase the user memory blocks based on a sanitize command from the host, provide, to the host, block address information of the user memory blocks based on a block address request from the host, access the user memory blocks based on block state check requests from the host, and provide, to the host, state information indicating whether the user memory blocks are erased according to access results.

16 Claims, 15 Drawing Sheets

(56) References Cited

U.S. PATENT DOCUMENTS

| | | | |
|---|---|---|---|
| 2015/0331790 A1 | 11/2015 | Kishi et al. | |
| 2016/0034217 A1* | 2/2016 | Kim | G06F 3/0622 |
| | | | 711/103 |
| 2016/0350003 A1* | 12/2016 | Kanno | G06F 3/0656 |
| 2019/0036704 A1* | 1/2019 | DeVetter | H04L 9/14 |

* cited by examiner

STORAGE DEVICE AND OPERATION METHOD OF ELECTRONIC SYSTEM

CROSS-REFERENCE TO RELATED APPLICATION(S)

This application claims priority to Korean Patent Application No. 10-2021-0181442 filed on Dec. 17, 2021 in the Korean Intellectual Property Office, the disclosure of which is incorporated by reference herein in its entirety.

BACKGROUND

The present disclosure relates to a storage device and a method of operating an electronic system including the storage device.

There may be advantages in that a storage device using a memory device has excellent stability and durability because there may be no mechanical driving portion, and also has a very fast information access speed and low power consumption. A storage device having these advantages may include a universal serial bus (USB) memory device, a memory card having various interfaces, a solid state drive (SSD), or the like.

The storage device may store security-sensitive data. Therefore, when the storage device is discarded, the data stored in the storage device should be completely removed. The storage device may support a sanitize operation capable of permanently deleting data stored therein, and a user may completely remove the user data stored in the storage device by providing a sanitize command to the storage device.

However, it may be difficult for the user to confirm whether all user data has actually been removed from the storage device after execution of the sanitize command is completed.

SUMMARY

Example embodiments provide configurations and operations related to a storage device supporting a sanitize operation.

Example embodiments also provide a storage device capable of verifying whether data in a user memory region, including a region difficult to access by a host using a logical address, has actually been removed.

According to an aspect of an example embodiment, a storage device includes a memory device including user memory blocks, wherein the user memory blocks provide a user data region; and a controller configured to: map logical addresses used in a host to a portion of the user data region, and use a remaining portion of the user data region as an over-provisioning region, wherein the controller is further configured to control the memory device to: erase the user memory blocks based on a sanitize command from the host, provide block address information of the user memory blocks to the host based on a block address request from the host, access the user memory blocks based on block state check requests from the host, and provide state information indicating whether the user memory blocks are erased, to the host, according to access results.

According to an aspect of an example embodiment, a storage device includes a memory device including user memory blocks providing a user data region; and a controller, wherein the controller is configured to control the memory device to: erase the user memory blocks based on a sanitize command from a host, map physical block addresses of the user memory blocks to virtual block addresses, provide block address information based on the virtual block addresses to the host based on a block address providing request from the host, access the user memory blocks based on block state check requests from the host, and provide state information indicating whether the user memory blocks are erased or not to the host according to access results.

According to an aspect of an example embodiment, a method of operating an electronic system including a host and a storage device, includes: providing, by the host, a sanitize command to the storage device; providing, by the storage device, a completion response after the storage device performs an erase operation of user memory blocks included in the storage device based on the sanitize command; requesting, by the host, block address information of the user memory blocks to the storage device; providing, by the storage device, the block address information to the host based on the request; providing, by the host, a state check request of a first user memory block, among the user memory blocks, with reference to the block address information; providing, by the storage device, state information indicating whether the first user memory block is erased based on the state check request from the host; and repeating, by the host, an operation of providing the state check request, until the host obtains state information of all of the user memory blocks.

BRIEF DESCRIPTION OF DRAWINGS

The above and other aspects, features, and advantages of certain example embodiments will be more clearly understood from the following detailed description, taken in conjunction with the accompanying drawings, in which.

DETAILED DESCRIPTION

Hereinafter, example embodiments will be described with reference to the accompanying drawings.

Figure 1:
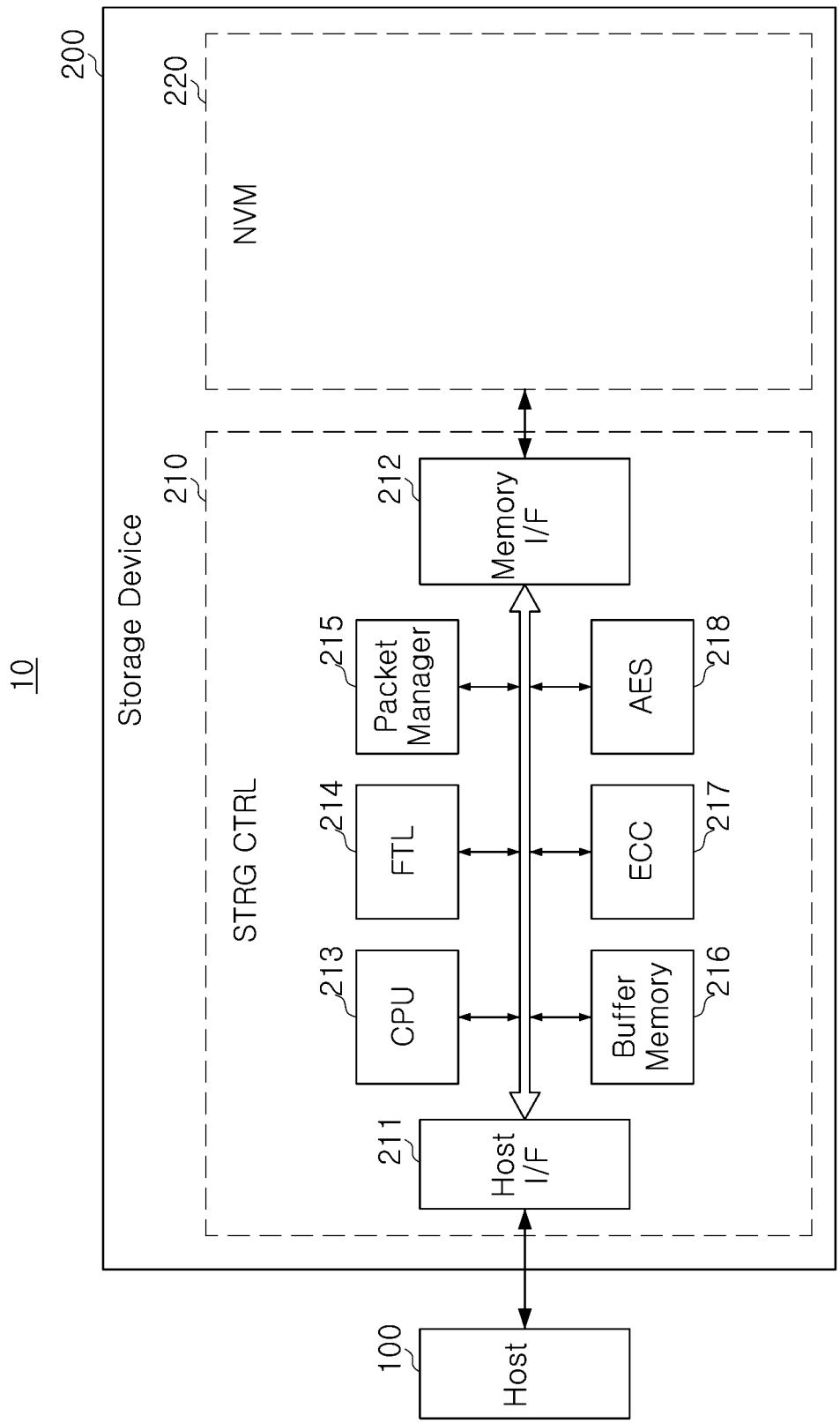
FIG. 1 is a block diagram illustrating a host-storage system according to an example embodiment.

FIG. 1 is a block diagram illustrating a host-storage system according to an example embodiment.

A host-storage system 10 may include a host 100 and a storage device 200. Also, the storage device 200 may include a storage controller 210 and a non-volatile memory (NVM) 220.

The host 100 may include electronic devices, for example, portable electronic devices such as mobile phones, MP3 players, laptop computers, and the like, or electronic devices such as desktop computers, game consoles, TVs, projectors, and the like. The host 100 may include at least one operating system (OS). The operating system may overall manage and control functions and operations of the host 100.

The storage device 200 may include storage media for storing data according to a request from the host 100. As an example, the storage device 200 may include at least one of a solid state drive (SSD), an embedded memory, or a removable external memory. When the storage device 200 is an SSD, the storage device 200 may be a device conforming to a non-volatile memory express (NVMe) standard. When the storage device 200 is an embedded memory or an external memory, the storage device 200 may be a device conforming to a universal flash storage (UFS) standard or an embedded multi-media card (eMMC) standard. The host 100 and the storage device 200 may generate and transmit a packet according to an adopted standard protocol, respectively.

The non-volatile memory 220 may maintain stored data even when power is not supplied. The non-volatile memory 220 may store data provided from the host 100 in a program operation, and may output the data stored in the non-volatile memory 220 in a read operation.

When the non-volatile memory 220 includes a flash memory, the flash memory may include a 2D NAND memory array or a 3D (or a vertical) NAND (VNAND) memory array. As another example, the storage device 200 may include other various types of non-volatile memories. For example, in the storage device 200, a magnetic RAM (MRAM), a spin-transfer torque MRAM, a conductive bridging RAM (CBRAM), a ferroelectric RAM (FeRAM), a phase RAM (PRAM), a resistive memory, and various other types of memory may be applied.

The storage controller 210 may control the non-volatile memory 220 in response to a request from the host 100. For example, the storage controller 210 may provide data read from the non-volatile memory 220 to the host 100, and may store the data provided from the host 100 in the non-volatile memory 220. For this operation, the storage controller 210 may support an operation such as a read operation, a program operation, an erase operation, or the like of the non-volatile memory 220.

The storage controller 210 may include a host interface 211, a memory interface 212, and a central processing unit (CPU) 213. In addition, the storage controller 210 may further include a flash translation layer (FTL) 214, a packet manager 215, a buffer memory 216, an error correction code (ECC) 217 engine, and an advanced encryption standard (AES) engine 218. The storage controller 210 may further include a working memory (not illustrated) into which the flash translation layer (FTL) 214 is loaded, and may control write and read operations of data for the non-volatile memory 220 by executing the flash translation layer 214 by the CPU 213.

The host interface 211 may transmit and receive a packet to and from the host 100. A packet transmitted from the host 100 to the host interface 211 may include a command, data to be written to the non-volatile memory 220, or the like, and a packet transmitted from the host interface 211 to the host 100 may include a response to the command, data to be read from the non-volatile memory 220, or the like.

The memory interface 212 may transmit data to be written to the non-volatile memory 220 to the non-volatile memory 220, or may receive data to be read from the non-volatile memory 220. The memory interface 212 may be implemented to comply with a standard protocol such as a toggle or an open NAND flash interface (ONFI).

The flash translation layer 214 may perform various operations such as an address mapping operation, a wear-leveling operation, and a garbage collection operation. The address mapping operation may be an operation of changing a logical address received from the host 100 into a physical address used to actually store data in the non-volatile memory 220. The wear-leveling operation may be an operation for preventing excessive degradation of a specific block by ensuring that blocks in the non-volatile memory 220 are used uniformly, and may be implemented by, for example, a firmware technique for balancing erase counts of physical blocks. The garbage collection operation may be an operation for securing usable capacity in the non-volatile memory 220 by copying valid data of a programmed block to a new block and then erasing the programmed block.

The packet manager 215 may generate a packet according to an interface protocol negotiated with the host 100, or may parse various types of information from a packet received from the host 100. Also, the buffer memory 216 may temporarily store data to be written to or read from the non-volatile memory 220. The buffer memory 216 may be provided in the storage controller 210, but may be disposed outside the storage controller 210.

The ECC engine 217 may perform an error detection and a correction function on read data read from the non-volatile memory 220. More specifically, the ECC engine 217 may generate parity bits for write data to be written into the non-volatile memory 220, and the generated parity bits may be stored in the non-volatile memory 220, together with the write data. When reading data from the non-volatile memory 220, the ECC engine 217 may correct an error in read data using parity bits read from the non-volatile memory 220, together with the read data, and the error-corrected read data may be output.

The AES engine 218 may perform at least one of an encryption operation or a decryption operation on data input to the storage controller 210 using a symmetric-key algorithm.

When there is a data deletion request from the host 100, the storage controller 210 may release address mapping between a logical address and a physical address, associated with the data, to block access of the host 100 to the data. Data stored in a memory region indicated by the physical address may not be actually removed. When the data stored therein is not actually removed in discarding the storage device 200, important data stored in the storage device 200 may be leaked.

To prevent leakage of user data, the storage device 200 may support a sanitize operation. The storage device 200 may permanently remove the user data stored in the storage device 200 in response to a sanitize command from the host 100. For example, the storage device 200 may perform a physical erase operation on a memory space capable of storing user data in the non-volatile memory 220, to permanently remove the user data.

In order for the host 100 to be able to trust security of the storage device 200, it is preferred that the host 100 verifies whether user data has actually been removed from the storage device 200 after processing of the sanitize command is completed. Among memory regions provided by the storage device 200, there may be a hidden region in which user data may be stored but the host 100 may not access using a logical address. When the host 100 may not check whether all data stored in the hidden region has been removed, the host 100 has difficulty in trusting security of the storage device 200.

According to an example embodiment the storage device 200 may provide address information related to the physical memory space of the storage device 200 to the host 100 in response to a request from the host 100. The host 100 may check whether the physical memory space of the storage device 200 has been erased using the address information. According to an example embodiment, since the host 100 may check whether all memory spaces in which user data may be stored, including the hidden region, have been erased, the host 100 may verify whether the sanitize operation has been normally performed. Therefore, reliability of the host 100 with respect to security of the storage device 200 may be improved.

Hereinafter, a method by which a host may verify whether a physical memory space of a storage device has been actually erased will be described in detail with reference to FIGS. 2 to 11. First, a physical memory space of a non-volatile memory 220 will be described in more detail with reference to FIGS. 2 to 5.

Figure 2:
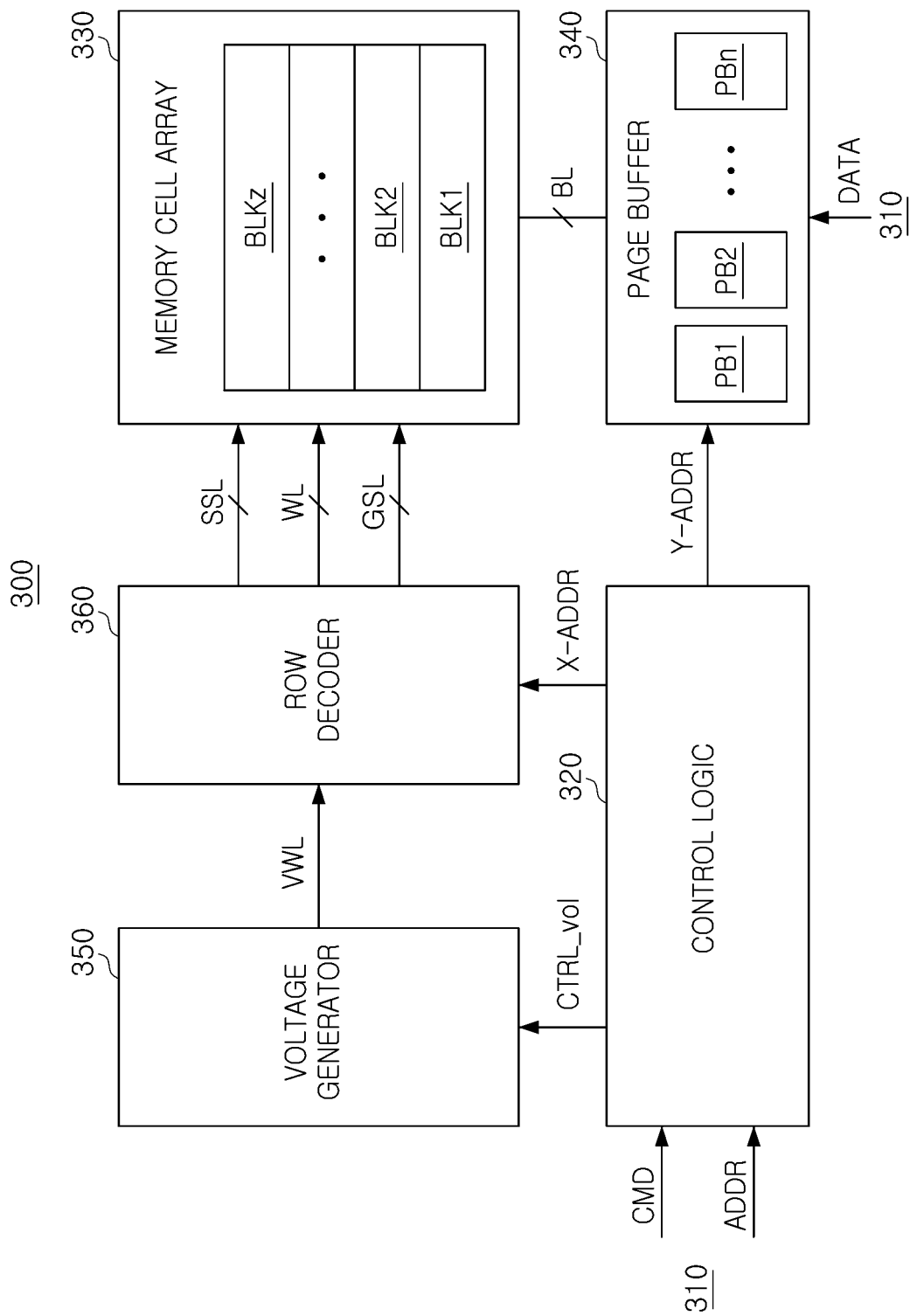
FIG. 2 is an example block diagram illustrating a memory device.

FIG. 2 is an example block view illustrating a memory device. Referring to FIG. 2, a memory device 300 may include a memory interface circuit 310, a control logic circuit 320, a memory cell array 330, a page buffer 340, a voltage generator 350, and a row decoder 360. Although not illustrated in FIG. 2, the memory device 300 may further include a memory interface circuit 310 illustrated in FIG. 2, and also may further include a column logic, a pre-decoder, a temperature sensor, a command decoder, an address decoder, and the like.

The control logic circuit 320 may generally control various operations in the memory device 300. The control logic circuit 320 may output various control signals in response to a command CMD and/or an address ADDR from the memory interface circuit 310. For example, the control logic circuit 320 may output a voltage control signal CTRL_vol, a row address X-ADDR, and a column address Y-ADDR.

The memory cell array 330 may include a plurality of memory blocks BLK1 to BLKz (where, z is a positive integer), and each of the plurality of memory blocks BLK1 to BLKz may include a plurality of memory cells. The memory cell array 330 may be connected to the page buffer unit 340 through bit lines BL, and may be connected to the row decoder 360 through word lines WL, string select lines SSL, and ground select lines GSL.

In an example embodiment, the memory cell array 330 may include a 3D memory cell array, and the 3D memory cell array may include a plurality of NAND strings. Each of the NAND strings may include memory cells respectively connected to word lines stacked vertically on a substrate. U.S. Pat. Nos. 7,679,133, 8,553,466, 8,654,587, 8,559,235, and U.S. Patent Publication No. 2011/0233648 are incorporated and combined herein by reference in their entirety. In an example embodiment, the memory cell array 330 may include a two-dimensional memory cell array, and the two-dimensional memory cell array may include a plurality of NAND strings arranged in row and column directions.

The page buffer 340 may include a plurality of page buffers PB1 to PBn (where, n is an integer greater than or equal to 3), and the plurality of page buffers PB1 to PBn may be respectively connected to memory cells through a plurality of bit lines BL. The page buffer 340 may select at least one bit line among the bit lines BL in response to the column address Y-ADDR. The page buffer 340 may operate as a write driver or a sense amplifier according to an operation mode. For example, during a program operation, the page buffer 340 may apply a bit line voltage corresponding to data to be programmed to a selected bit line. During a read operation, the page buffer 340 may sense data stored in the memory cell by sensing a current or a voltage of the selected bit line.

The voltage generator 350 may generate various types of voltages for performing program, read, and erase operations, based on the voltage control signal CTRL_vol. For example, the voltage generator 350 may generate a program voltage, a read voltage, a program verify voltage, an erase voltage, or the like, as a word line voltage VWL.

The row decoder 360 may select one of the plurality of word lines WL in response to the row address X-ADDR, and may select one of the plurality of string select lines SSL. For example, the row decoder 360 may apply a program voltage and a program verify voltage to a selected word line during the program operation, and may apply a read voltage to the selected word line during the read operation.

Figure 3:
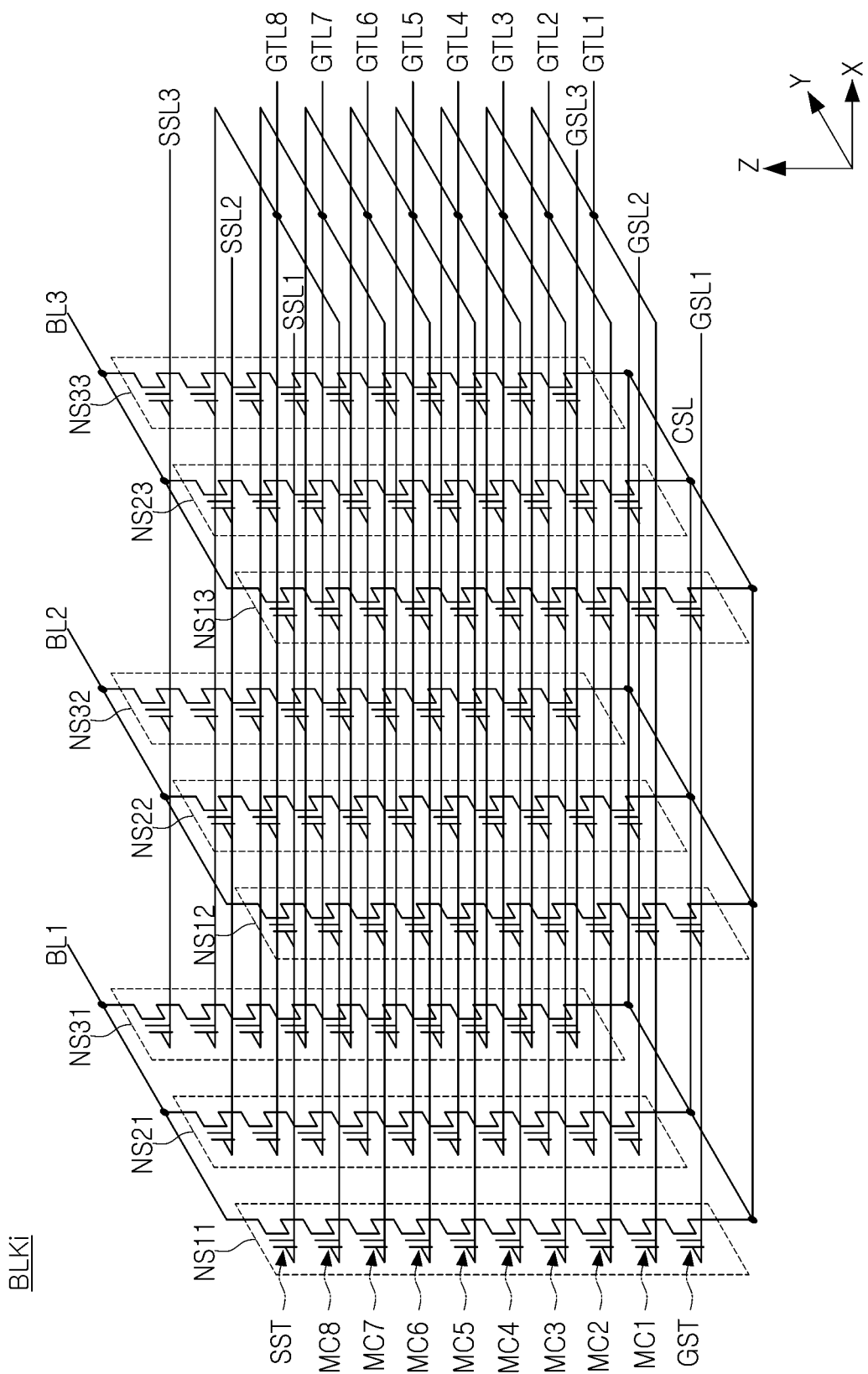
FIG. 3 is a view illustrating a 3D V-NAND structure applicable to a storage device according to an example embodiment.

FIG. 3 is a view illustrating a 3D V-NAND structure applicable to a storage device according to an example embodiment. When a non-volatile memory of a storage device is implemented as a 3D V-NAND type flash memory, a plurality of memory blocks constituting the non-volatile memory may be respectively represented by an equivalent circuit as illustrated in FIG. 3.

A memory block BLKi illustrated in FIG. 3 may represent a three-dimensional memory block formed on a substrate in a three-dimensional structure. For example, a plurality of memory NAND strings included in the memory block BLKi may be formed in a direction, perpendicular to the substrate.

Referring to FIG. 3, the memory block BLKi may include a plurality of memory NAND strings NS11 to NS33 connected between bit lines BL1, BL2, and BL3 and a common source line CSL. Each of the plurality of memory NAND strings NS11 to NS33 may include a string select transistor SST, a plurality of memory cells MC1, MC2, . . . , MC8, and a ground select transistor GST. Although it is illustrated in FIG. 3 that each of the plurality of memory NAND strings NS11 to NS33 includes eight memory cells MC1, MC2, . . . , MC8, embodiments are not limited thereto.

The string select transistor SST may be connected to string select lines SSL1, SSL2, and SSL3 corresponding thereto. The plurality of memory cells MC1, MC2, . . . , MC8 may be respectively connected to gate lines GTL1, GTL2, . . . , GTL8 corresponding thereto. The gate lines GTL1, GTL2, . . . , GTL8 may correspond to word lines, and a portion of the gate lines GTL1, GTL2, . . . , GTL8 may correspond to dummy word lines. The ground select transistor GST may be connected to ground select lines GSL1, GSL2, and GSL3 corresponding thereto. The string select transistor SST may be connected to the bit lines BL1, BL2, and BL3 corresponding thereto, and the ground select transistor GST may be connected to the common source line CSL.

Word lines having the same height (e.g., WL1) may be commonly connected, and the ground selection lines GSL1, GSL2, and GSL3 and the string select lines SSL1, SSL2, and SSL3 may be separated from each other. In FIG. 3, the memory block BLKi is illustrated as being connected to eight gate lines GTL1, GTL2, . . . , GTL8 and three bit lines BL1, BL2, BL3, but embodiments are not limited thereto.

When the memory cells included in the memory block BLKi are programmed, threshold voltages of the memory cells may form certain probability distributions. Threshold voltage distributions may be mapped to different logic states.

Figure 4:
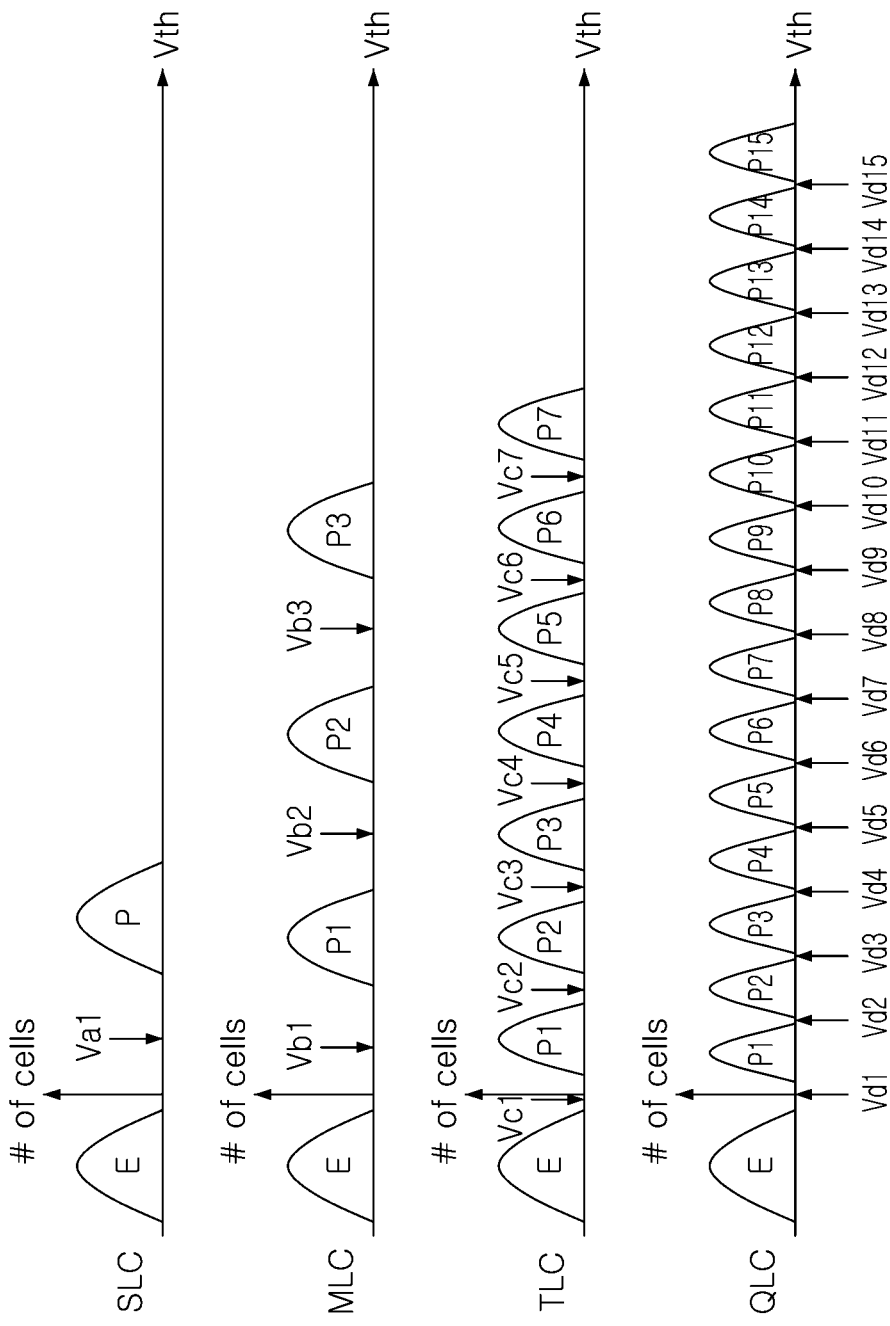
FIG. 4 is a view illustrating threshold voltage distributions of memory cells.

FIG. 4 is a view illustrating threshold voltage distributions of memory cells.

In graphs illustrated in FIG. 4, a horizontal axis indicates a magnitude of a threshold voltage, and a vertical axis indicates the number of memory cells. FIG. 4 illustrates a logic state indicated by each threshold voltage distribution.

When a memory cell may be a single level cell (SLC) that stores 1-bit data, the memory cell may have a threshold voltage corresponding to one of an erase state E and a program state P. The read voltage Va1 may be a voltage for distinguishing the erase state E from the program state P. Since the memory cell having the program state P has a lower threshold voltage than the read voltage Va1, it may be read as an on-cell. Since the memory cell having the erase state E has a higher threshold voltage than the read voltage Va1, it may be read as an off cell.

When a memory cell is a multiple level cell (MLC) that stores 2-bit data, the memory cell may have a threshold voltage corresponding to any one of an erase state (E) and first to third program states P1 to P3. First to third read voltages Vb1 to Vb3 may be read voltages for distinguishing each of the erase state E and the first to third program states P1 to P3. The first read voltage Vb1 may be a read voltage for distinguishing the erase state E and the first program state P1. The second read voltage Vb2 may be a read voltage for distinguishing the first program state P1 and the second program state P2. The third read voltage Vb3 may be a read voltage for distinguishing the second program state P2 and the third program state P3.

When a memory cell is a triple level cell (TLC) that stores 3-bit data, the memory cell may have a threshold voltage corresponding to any one of the erase state E and first to seventh program states P1 to P7. First to seventh read voltages Vc1 to Vc7 may be read voltages for distinguishing each of the erase state E and the first to seventh program states P1 to P7. The first read voltage Vc1 may be a read voltage for distinguishing the erase state E and the first program state P1. The second read voltage Vc2 may be a read voltage for distinguishing the first program state P1 and the second program state P2. In the same manner, the seventh read voltage Vc7 may be a read voltage for distinguishing the sixth program state P6 and the seventh program state P7.

When a memory cell is a quadruple level cell (QLC) that stores 4-bit data, the memory cell may have a threshold voltage corresponding to any one of first to fifteenth program states P1 to P15. First to fifteenth read voltages Vd1 to Vd15 may be read voltages for distinguishing each of the erase state E and the first to fifteenth program states P1 to P15. The first read voltage Vd1 may be a read voltage for distinguishing the erase state E and the first program state P1. The second read voltage Vd2 may be a read voltage for distinguishing the first program state P1 and the second program state P2. In the same manner, the fifteenth read voltage Vd15 may be a read voltage for distinguishing the fourteenth program state P14 and the fifteenth program state P15.

Figure 5:
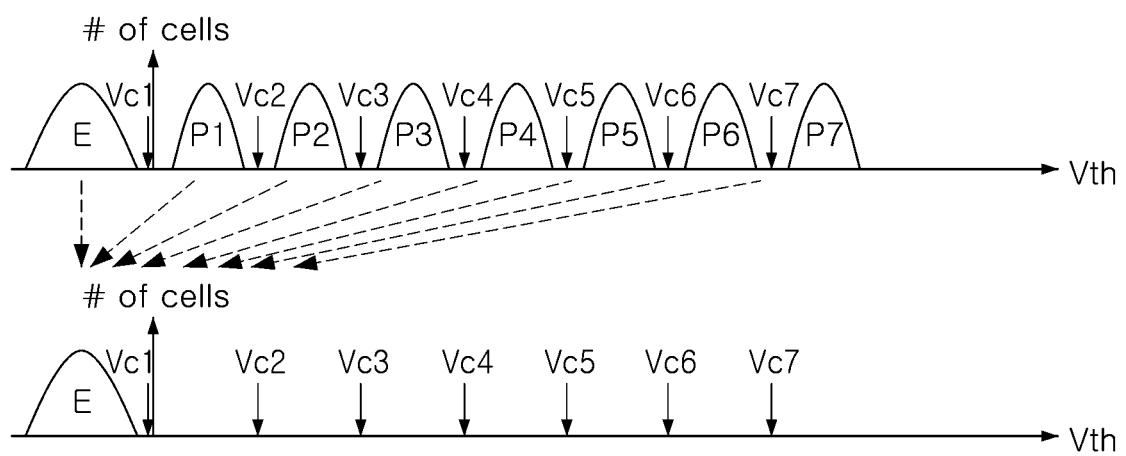
FIG. 5 is a view illustrating a threshold voltage distribution of memory cells according to a sanitize operation.

FIG. 5 is a view illustrating a threshold voltage distribution of memory cells according to a sanitize operation.

A storage device 200 may perform a sanitize operation by physically erasing memory blocks storing user data. FIG. 5 illustrates a threshold voltage distribution of memory cells by taking a case in which the memory cells are TLC as an example. The y-axis (vertical axis or ordinate) in FIG. 5 indicates a number of cells ("# of cells"), with the threshold voltage shown on the x-axis (horizontal axis or abscissa). When an erase operation is performed on memory cells having various threshold voltage distributions E, and P1 to P7, the memory cells may have an erase state E. When a first read voltage Vc1 may be applied to a word line to which memory cells having the erase state E are connected, all of the memory cells may be read as on-cells.

A physical space of the non-volatile memory described with reference to FIGS. 2 to 5 may be physically and logically divided into a plurality of regions. Hereinafter, storage regions provided by the non-volatile memory will be described with reference to FIGS. 6 to 7.

Figure 6:
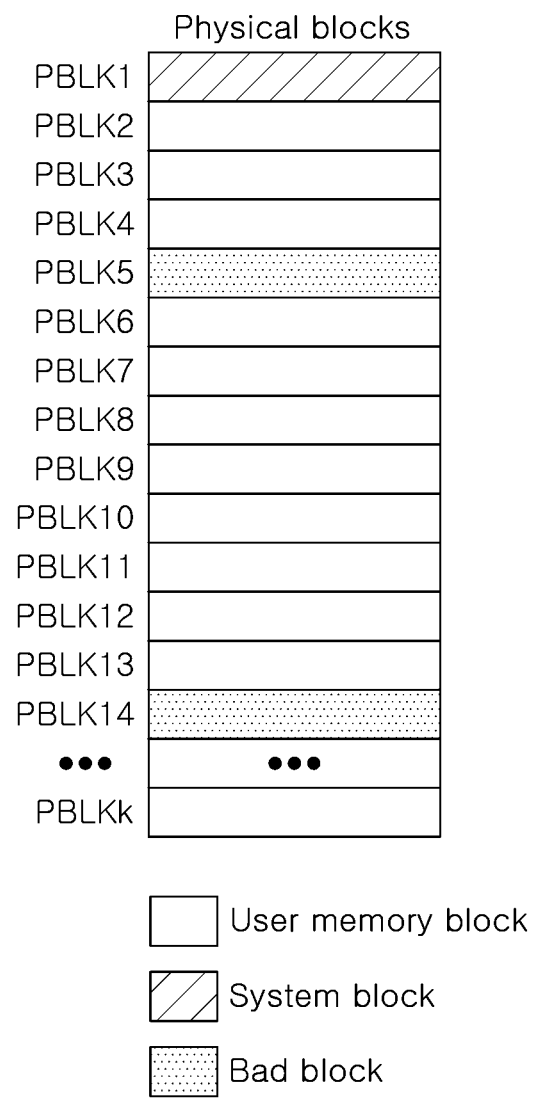
FIG. 6 illustrates memory blocks that may be included in a non-volatile memory.

FIG. 6 illustrates memory blocks that may be included in a non-volatile memory.

Referring to FIG. 6, a non-volatile memory 220 may include a plurality of memory blocks. Each of the plurality of memory blocks may have physical block addresses PBLK1 to PBLKk.

The memory blocks may include a normal memory block that may normally store data, and a bad memory block that may not normally store data. The bad memory block may occur due to an initial failure, or may occur during use of a storage device. In FIG. 6, the bad memory block is illustrated with a dot pattern.

The normal memory block may include a user memory block that may store user data, and a system memory block that may store system data. In FIG. 6, the system memory block is illustrated to have a hatched pattern, and the user memory block is illustrated to have no pattern.

The user memory block may provide a user data region to a host 100. For example, a memory region provided by the user memory block may be mapped to a logical address used in the host 100. The memory region provided by the user memory block may be mapped to the logical address, but not all of the memory region may be mapped to the logical address.

Figure 7:
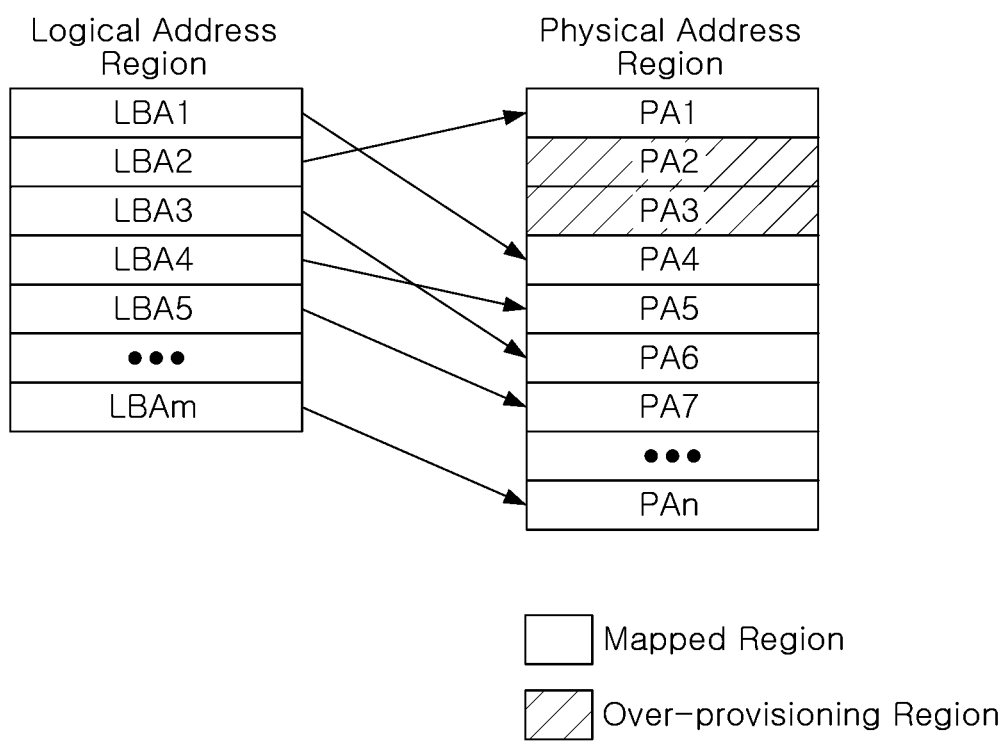
FIG. 7 is a view illustrating a mapping relationship between a user data region and logical addresses.

FIG. 7 is a view illustrating a mapping relationship between a user data region and logical addresses.

A user data region may include a logical address region that may be accessed using a logical address, and an over-provisioning region that may not be accessed using a logical address. The over-provisioning region may be a region additionally provided in addition to the logical address region, to smoothly perform a background operation such as the garbage collection operation, the wear-leveling operation, or the like. The over-provisioning region may not be accessed by a host, but may store user data. For example, invalid data may remain in the over-provisioning region.

FIG. 7 illustrates a logical address region corresponding to logical addresses LBA1 to LBAm, and a user data region provided by a user memory block. The user data region may have a plurality of physical addresses PA1 to PAn. For example, each of the physical addresses may correspond to a page included in a memory block. The physical addresses PA1 to PAn of the user data region may not be necessarily contiguous.

A portion of the physical addresses PA1 to PAn of the user data region may be mapped to the logical addresses, and a remaining portion thereof may not be mapped to the logical addresses. A region that may not be mapped to the logical addresses may be an over-provisioning region. In FIG. 7, the over-provisioning region is illustrated to have a hatched pattern.

A method capable of verifying whether data in all user data regions including a region mapped to a logical address and an over-provisioning region have been removed or not, to verify whether a sanitize operation has been successfully performed or not on a storage device 200 by a host 100, is required.

Figure 8:
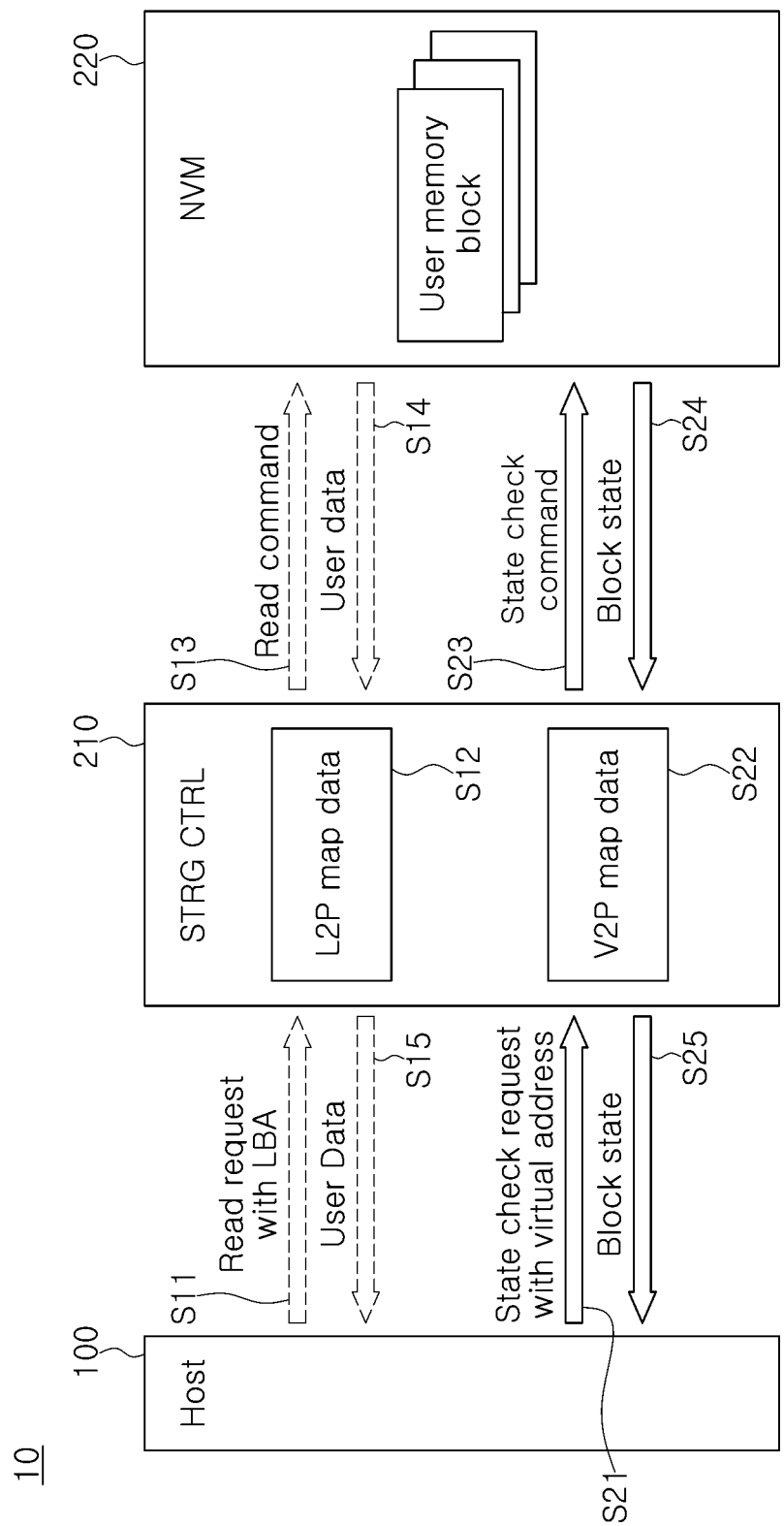
FIG. 8 is a view illustrating interaction of a host-storage system according to an example embodiment.

FIG. 8 is a view illustrating interaction of a host-storage system according to an example embodiment.

Signals exchanged between a host 100, a storage controller 210, and a non-volatile memory 220 included in a host-storage system 10 may be indicated by arrows.

An arrow indicated by a solid line refers to a signal in which the host 100, the storage controller 210, and the non-volatile memory 220 exchange, to check a state of a physical space of the non-volatile memory 220 by the host 100 according to an example embodiment. In addition, an arrow indicated by a dashed line refers to an example of a signal in which the host 100, the storage controller 210, and the non-volatile memory 220 give and receive, to access to a physical space of the non-volatile memory 220 using a logical address by the host 100.

First, a method for a host 100 to access a physical space of a non-volatile memory 220 using a logical address will be described.

In S11, a host 100 may provide a read request including a logical address to a storage controller 210. For example, the logical address may be a logical block address (LBA) used in a file system of the host 100.

In S12, with reference to logical-to-physical (L2P) map data indicating a mapping relationship between the logical address and a physical address of a non-volatile memory 220, the storage controller 210 may convert the logical address received from the host 100 to the physical address.

In S13, the storage controller 210 may provide a read command including the converted physical address to the non-volatile memory 220.

In S14, the non-volatile memory 220 may access a physical region indicated by the physical address in response to the read command, to provide user data to the storage controller 210. In S15, the storage controller 210 may provide the user data to the host 100.

After the host 100 provides a sanitize command, the read request as described in S11 may be provided for an entire logical address region to check whether all of the user data in the non-volatile memory 220 has been removed or not, and it is also possible to check whether data indicating an erase state has been output or not in all logical address regions.

When the host 100 reads data of the entire logical address region, the storage controller 210 should output user data of the entire logical address region. Therefore, data traffic between the host 100 and the storage controller 210 may increase, and it may take a long time to determine whether user data has been removed or not. Also, even when the host 100 confirms whether the data indicating the erase state has been output or not in the entire logical address region, it may not verify whether the user data stored in an over-provisioning region has been removed or not.

According to an example embodiment, the storage controller 210 may provide address information of user memory blocks of the non-volatile memory 220 to the host 100 in response to a request from the host 100. For example, the storage controller 210 may allocate virtual block addresses to user memory blocks among a plurality of memory blocks having physical block addresses, and may provide the virtual block addresses to the host 100.

In S21, the host 100 may provide a state check request for virtual block addresses to the storage controller 210. In S22, the storage controller 210 may convert a virtual block address to a physical block address. In S23, the storage controller 210 may send a state check command to the non-volatile memory 220 to check whether the memory block having the physical block address are erased or not. The non-volatile memory 220 may determine whether a memory block is erased or not, based on threshold voltage distribution of memory cells included in the memory block. In S24, the non-volatile memory 220 may provide block state information indicating whether the memory block is erased or not. In S25, the storage controller 210 may provide the block state information from the non-volatile memory 220 to the host 100.

According to an example embodiment, the host 100 may verify whether the entire user data region has been erased or not, in addition to an over-provisioning region that may not be accessed using a logical address. In addition, instead of the storage device 200 providing read data, based on logical addresses, to the host 100, the storage device 200 may provide only information indicating whether to erase to the host 100. Therefore, the host 100 may quickly and accurately check whether all user data has been removed or not in the storage device 200, after processing of the sanitize command is completed.

Figure 9A:
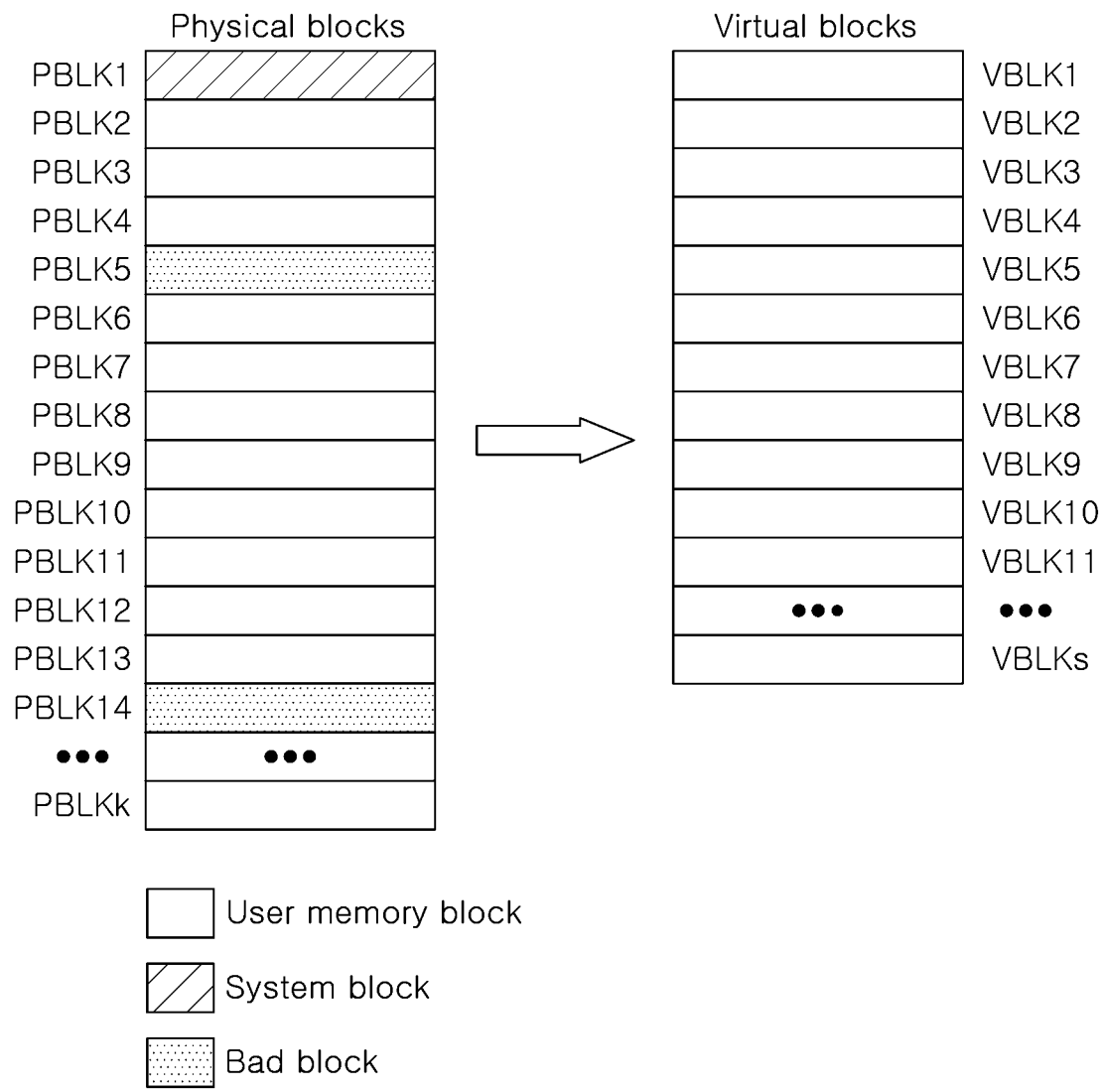
FIGS. 9A, 9B, and 10 are views illustrating relationship between a physical block address and a virtual block address.
Figure 9B:
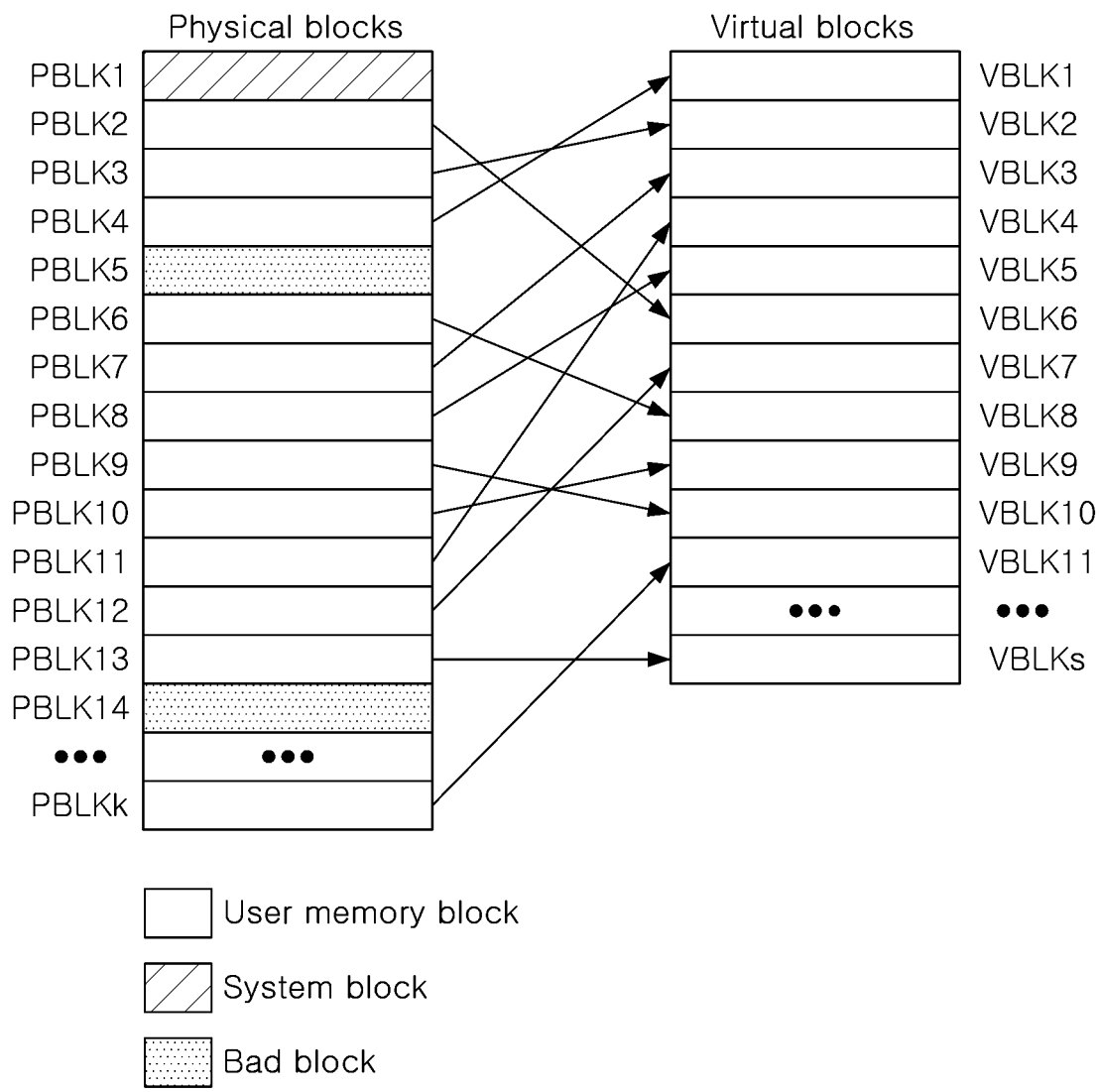
Figure 10:
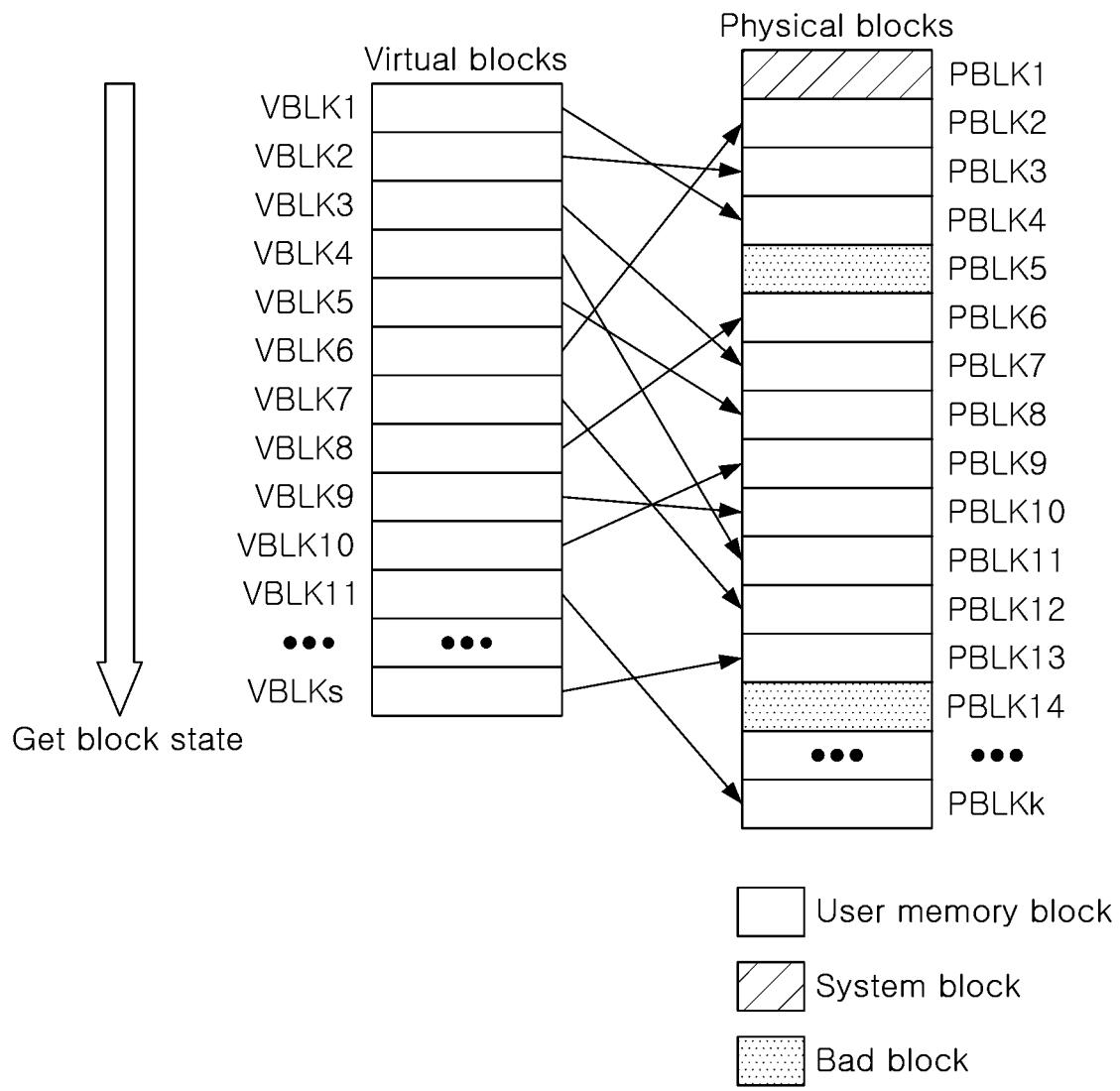

FIGS. 9A, 9B, and 10 are views illustrating relationship between a physical block address and a virtual block address.

As described with reference to FIG. 6, memory blocks may include a user memory block, a system memory block, and a bad memory block. The memory blocks may correspond to physical block addresses PBLK1 to PBLKk. The memory blocks corresponding to the physical block addresses PBLK1 to PBLKk may be referred to as physical blocks.

According to an example embodiment, a storage controller 210 may allocate virtual block addresses VBLK1 to VBLKs to user memory blocks. Virtual memory blocks corresponding to the virtual block addresses VBLK1 to VBLKs may be referred to as virtual blocks.

The storage controller 210 may provide the allocated virtual block addresses VBLK1 to VBLKs to a host 100, to confirm states of the user memory blocks by the host 100. The user memory blocks may have non-contiguous addresses, due to bad memory blocks included in the physical blocks. Contiguous virtual block addresses VBLK1 to VBLKs may be allocated to the user memory blocks, according to an example embodiment.

The host 100 may sequentially provide the virtual block addresses VBLK1 to VBLKs to the storage controller 210, to verify whether all of the user memory blocks have been erased or not. Once it is verified that all of the user memory blocks have been erased, it may be verified that all user data of the storage device 200 has been removed.

FIG. 9B illustrates a mapping relationship between physical block addresses PBLK1 to PBLKk and virtual block addresses VBLK1 to VBLKs. According to an example embodiment, when user memory blocks are mapped to the virtual block addresses VBLK1 to VBLKs, a storage controller 210 may map the physical block addresses to the virtual block addresses VBLK1 to VBLKs in a random order, instead of mapping the physical block addresses.

When the physical block addresses are mapped to the virtual block addresses VBLK1 to VBLKs in a random order, a host 100 may access all of the user memory blocks using the virtual block addresses VBLK1 to VBLKs, but the physical block addresses of each of the user memory blocks may become unknown. When the host 100 knows both logical addresses and the physical block addresses of the user memory blocks, an address mapping algorithm of an FTL 214 may be leaked to the host 100. According to an example embodiment, since the host 100 may not know the physical block addresses of the user memory blocks, an address mapping technique of the storage controller 210 may be protected.

FIG. 10 illustrates a mapping relationship between virtual block addresses VBLK1 to VBLKs and physical block addresses PBLK1 to PBLKk. Referring to FIG. 10, virtual block addresses VBLK1 to VBLKs may be mapped to physical block addresses of user memory blocks in a one-to-one manner. A host 100 may sequentially request block state information for each of the virtual block addresses VBLK1 to VBLKs, to obtain state information of all user memory blocks of a non-volatile memory 220. The sequential accessing is indicated by the arrow on the left side of FIG. 10 advancing in time from the top of FIG. 10 toward the bottom and labelled "get block state." Therefore, the host 100 may verify whether all memory regions in which user data is stored have been erased or not using the virtual block addresses VBLK1 to VBLKs.

Figure 11:
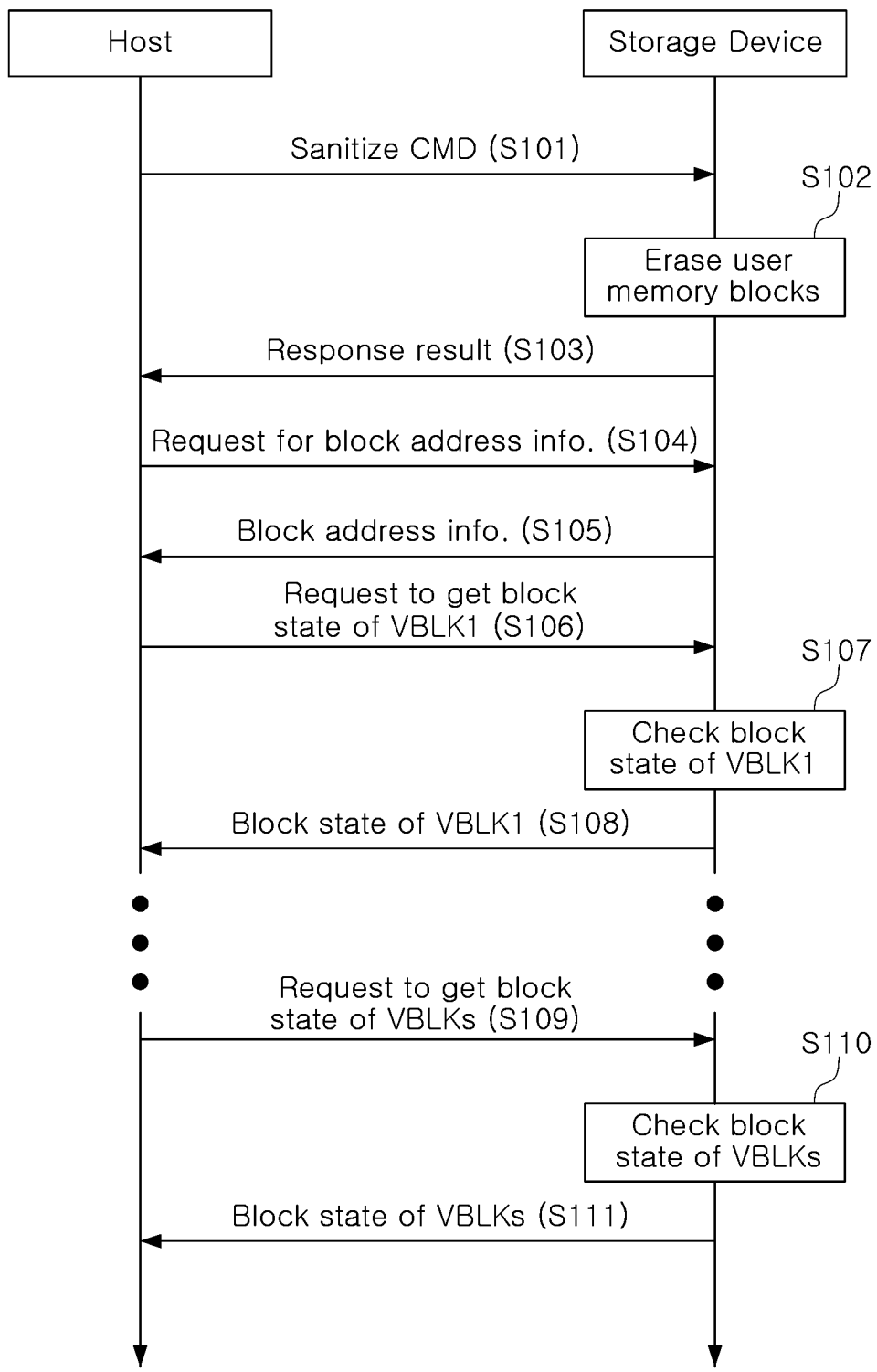
FIG. 11 is a flowchart illustrating interaction of a host-storage system according to an example embodiment.

FIG. 11 is a flowchart illustrating interaction of a host-storage system according to an example embodiment.

In S101, a host may provide a sanitize command to a storage device.

In S102, the storage device may perform an erase operation on all user memory blocks included in the storage device, in response to the sanitize command from the host. In addition, in S103, the storage device may provide a response to an execution result of the sanitize command to the host.

After receiving from the storage device a response indicating that the sanitize command has been successfully performed, the host may perform S104 to S111 to verify whether all user data has been removed or not from the storage device.

In S104, the host may request block address information of the user memory blocks from the storage device. In response to the host's request, in S105, the storage device may provide the block address information of the user memory blocks to the host.

Instead of providing the physical block addresses of the user memory blocks to the host as they are, the storage device may map physical block addresses to virtual block addresses, and may provide the virtual block addresses as the block address information to the host.

According to an example embodiment, instead of providing the virtual block addresses, the storage device may provide number information of the user memory blocks to which the virtual block addresses are allocated to the host as the block address information.

The host may request state information of each of the user memory blocks using the block address information from the storage device.

In S106, the host may provide a request for obtaining a block state corresponding to a first virtual block address VBLK1.

In S107, the storage device may check the block state corresponding to the first virtual block address VBLK1. Specifically, the storage device may convert the first virtual block address VBLK1 into a physical block address, and may check threshold voltage distributions of memory cells included in a memory block corresponding to the physical block address, to determine whether the memory block is erased or not.

In S108, the storage device may provide state information of the memory block corresponding to the first virtual block address VBLK1. Sequential requests and responses for the virtual block addresses are indicated by the vertical ellipsis in FIG. 11 concluding with S109 (a block state request) and S110 (a check block action by the storage device).

The host may sequentially request from the storage device, from a block state corresponding to the first virtual block address VBLK1 to a block state corresponding to the last virtual block address VBLKs. S109 to S111 represent operations in which the host requests a block state corresponding to the last virtual block address VBLKs from the storage device, and the storage device checks the block state and provides the block state to the host.

When it is verified that all of the user memory blocks have erase states through the operations of S106 to S111, the host may verify whether all user data of the storage device has been removed by the sanitize command. Therefore, reliability for security of the storage device may be improved, and a user may safely destroy the storage device.

Hereinafter, a structure of a memory device to which embodiments may be applied, and an example of a system to which embodiments may be applied, will be described with reference to FIGS. 12 to 14.

Figure 12:
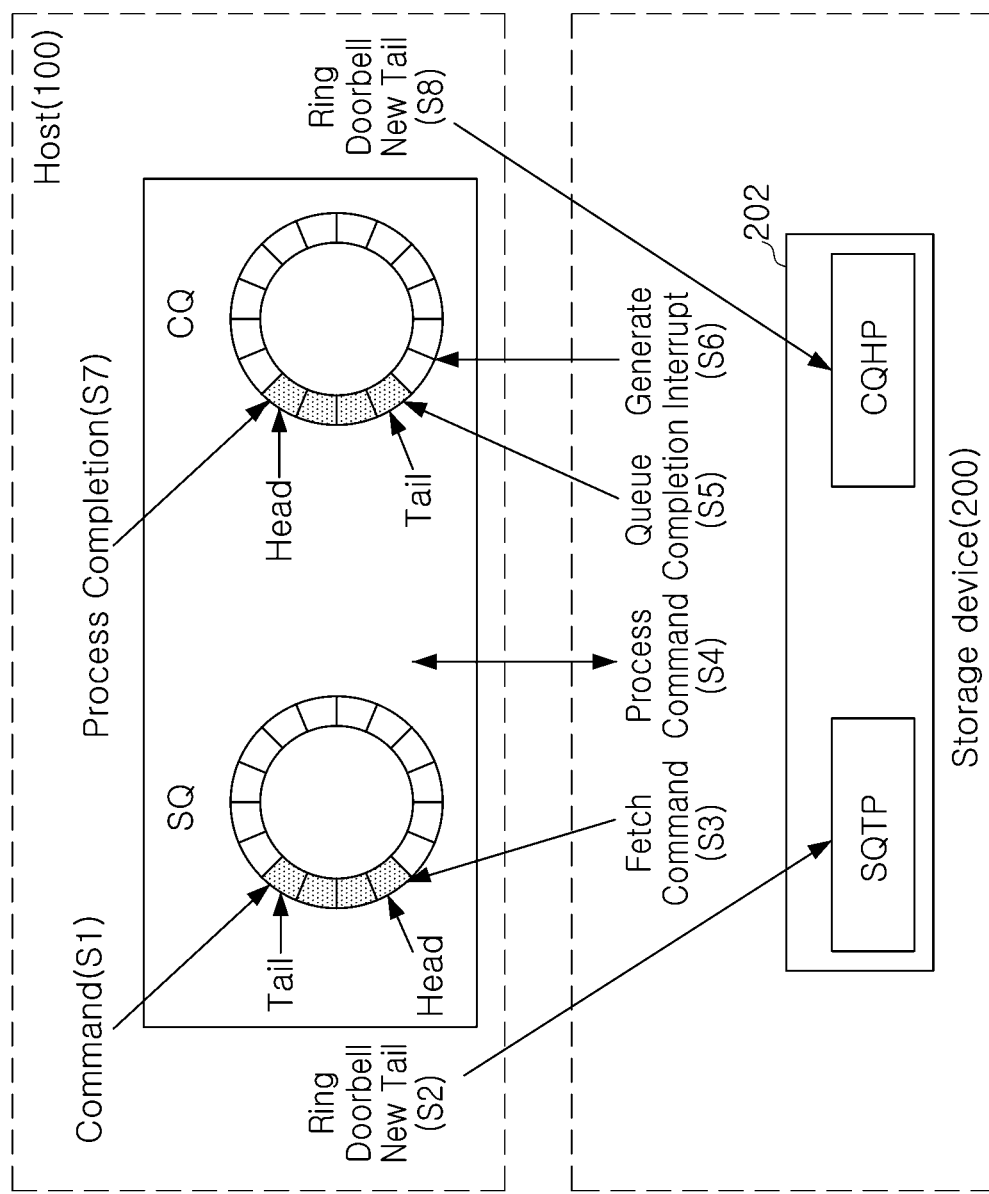
FIG. 12 is a view illustrating an interface protocol between a host and a storage device.

FIG. 12 is a view illustrating an interface protocol between a host and a storage device.

FIG. 12 illustrates a host 100 and a storage device 200. The host 100 and the storage device 200 illustrated in FIG. 12 correspond to the host 100 and the storage device 200 described with reference to FIG. 1.

The host 100 may communicate with the storage device 200 using a command queue interface supporting a protocol such as NVMe. The command queue interface may use a queue pair including a submission queue SQ for inputting a requested command and a completion queue CQ for recording a processing result of the command, to support interfacing between the host 100 and the storage device 200. Generally, as seen in FIG. 12, a command is indicated by S1, an indication of a new tail is indicated by S2 and S8, a fetch command by S3, a process command by S4, a queue completion indicated by S5, an interrupt generation indication by S6, a process completion by S7 as described further below.

The host 100 may create a queue pair. According to an example embodiment, the queue pair may be stored in a host memory 120.

The storage device 200 may include a doorbell register 202 to perform a command queue interface operation. The doorbell register 202 may be a register for controlling the queue pair generated by the host 100. The doorbell register 202 may store a submission queue tail pointer SQTP and a completion queue head pointer CQHP.

In S1, a host 100 may queue a command in a submission queue SQ to request a storage device 200 to perform the command. In S2, the host 100 may update a submission queue tail pointer SQTP, and may provide the updated submission queue tail pointer SQTP to the storage device 200. The storage device 200 may store the updated submission queue tail pointer SQTP in a doorbell register 202.

In S3, the storage device 200 may fetch the command from the submission queue SQ. In S4, the storage device 200 may process the fetched command.

In S5, after processing the command, the storage device 200 may record completion of processing of the command in a completion queue CQ. For example, the storage device 200 may record a completion queue entry in the completion queue CQ. In this case, a completion queue head pointer CQHP may increase. In S6, the storage device 200 may generate an interrupt signal.

In S7, the host 100 may complete the command. In S8, the host 100 may provide an updated completion queue head pointer CQHP to the storage device 200. The storage device 200 may store the updated completion queue head pointer CQHP in the doorbell register 202.

The storage device 200 may support a sanitize command that allows the host 100 to permanently remove user data stored in the storage device 200 through an interface such as that described with reference to FIG. 12.

According to an example embodiment, a storage device 200 may support a command to check states of user memory blocks, to check whether user data stored in the storage device 200 has been actually deleted after a host 100 receives a completion response to a sanitize command. The host 100 may check whether all of the user memory blocks have been erased or not, even when there is a region that may not be accessed using a logical address among user data regions provided by the user memory blocks.

Figure 13:
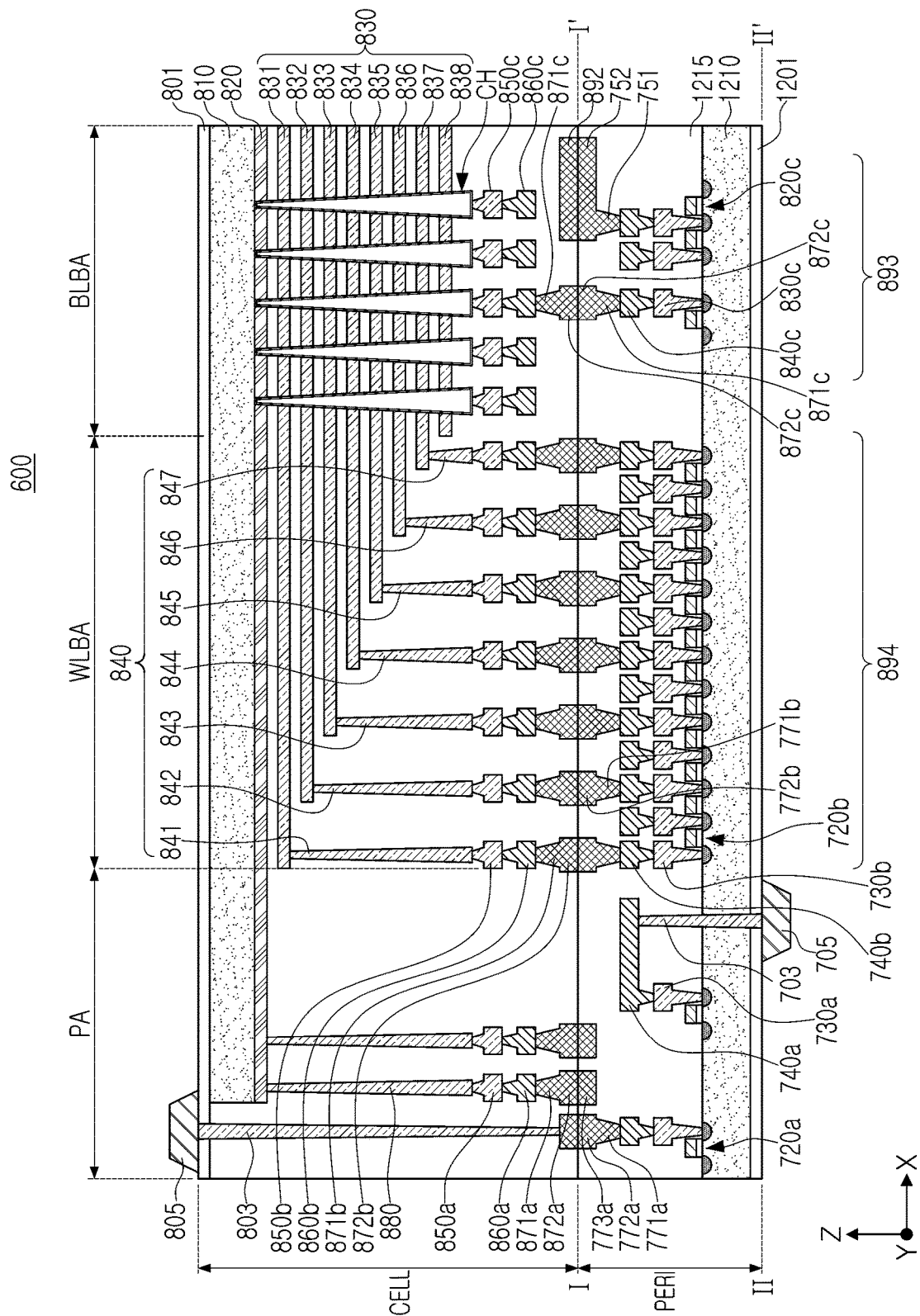
FIG. 13 is a cross-sectional view illustrating a memory device according to an example embodiment.

FIG. 13 is a cross-sectional view illustrating a memory device according to an example embodiment.

Referring to FIG. 13, a non-volatile device 600 may have a chip-to-chip (C2C) structure. The C2C structure may refer to a structure formed by manufacturing an upper chip including a cell region CELL on a first wafer, manufacturing a lower chip including a peripheral circuit region PERI on a second wafer, different from the first wafer, and then bonding the upper chip and the lower chip to each other by a bonding process. For example, the bonding process may refer to a method of electrically connecting a bonding metal formed on an uppermost metal layer of the upper chip and a bonding metal formed on an uppermost metal layer of the lower chip. For example, when the bonding metal is formed of copper (Cu), the bonding method may be a Cu—Cu bonding method, and the bonding metal may also be formed of aluminum or tungsten.

Each of the peripheral circuit region PERI and the cell region CELL of the non-volatile device 600 may include an external pad bonding area PA, a word line bonding area WLBA, and a bit line bonding area BLBA. The peripheral circuit region PERI may include a first substrate 710, an interlayer insulating layer 715, a plurality of circuit elements 720*a*, 720*b*, and 720*c* formed on the first substrate 710, first metal layers 730*a*, 730*b*, and 730*c* respectively connected to the plurality of circuit elements 720*a*, 720*b*, and 720*c*, and second metal layers 740*a*, 740*b*, and 740*c* formed on the first metal layers 730*a*, 730*b*, and 730*c*. In an example embodiment, the first metal layers 730*a*, 730*b*, and 730*c* may be formed of tungsten having relatively high electrical resistivity, and the second metal layers 740*a*, 740*b*, and 740*c* may be formed of copper having relatively low electrical resistivity.

In this specification, only the first metal layers 730*a*, 730*b*, 730*c* and the second metal layers 740*a*, 740*b*, and 740*c* are illustrated and described, but not limited thereto, and at least one or more metal layers may be further formed on the second metal layers 740*a*, 740*b*, and 740*c*. At least a portion of the one or more metal layers formed on the second metal layers 740*a*, 740*b*, and 740*c* may be formed of aluminum or the like having a lower resistance than copper forming the second metal layers 740*a*, 740*b*, and 740*c*.

The interlayer insulating layer 715 may be disposed on the first substrate 710 to cover the plurality of circuit elements 720*a*, 720*b*, and 720*c*, the first metal layers 730*a*, 730*b*, and 730*c*, and the second metal layers 740*a*, 740*b*, and 740*c*. The interlayer insulating layer 715 may include an insulating material such as silicon oxide, silicon nitride, or the like.

Lower bonding metals 771*b* and 772*b* may be formed on the second metal layer 740*b* in the word line bonding area WLBA. In the word line bonding area WLBA, the lower bonding metals 771*b* and 772*b* in the peripheral circuit region PERI may be electrically bonded to upper bonding metals 871*b* and 872*b* of the cell region CELL. The lower bonding metals 771*b* and 772*b* and the upper bonding metals 871*b* and 872*b* may be formed of aluminum, copper, tungsten, or the like. The upper bonding metals 871*b* and 872*b* of the cell region CELL may be referred to as first metal pads, and the lower bonding metals 771*b* and 772*b* of the peripheral circuit region PERI may be referred to as second metal pads.

The cell region CELL may include at least one memory block. The cell region CELL may include a second substrate 810 and a common source line 820. On the second substrate 810, a plurality of word lines 831 to 838 (i.e., 830) may be stacked in a direction (the Z-axis direction), perpendicular to an upper surface of the second substrate 810. A string select line and a ground select line may be arranged on and below the plurality of word lines 830, respectively, and the plurality of word lines 830 may be disposed between the at least one string select line and the at least one ground select line.

In the bit line bonding area BLBA, a channel structure CH may extend in a direction, perpendicular to the upper surface of the second substrate 810, and pass through the plurality of word lines 830, the string select line, and the ground select line. The channel structure CH may include a data storage layer, a channel layer, a buried insulating layer, and the like, and the channel layer may be electrically connected to a first metal layer 850*c* and a second metal layer 860*c*. For example, the first metal layer 850*c* may be a bit line contact, and the second metal layer 860*c* may be a bit line. In an example embodiment, the bit line may extend in the first direction (the Y-axis direction), parallel to the upper surface of the second substrate 810.

In the example embodiment illustrated in FIG. 13, an area in which the channel structure CH, the bit line 860*c*, and the like are disposed may be defined as the bit line bonding area BLBA. In the bit line bonding area BLBA, the bit line may be electrically connected to the circuit elements 720*c* providing a page buffer 893 in the peripheral circuit region PERI. The bit line 860*c* may be connected to upper bonding metals 871*c* and 872*c* in the cell region CELL, and the upper bonding metals 871*c* and 872*c* may be connected to lower bonding metals 771*c* and 772*c* connected to the circuit elements 720*c* of the page buffer 893.

In the word line bonding area WLBA, the word lines 830 may extend in a second direction (an X-axis direction), parallel to the upper surface of the second substrate 810 and perpendicular to the first direction, and may be connected to a plurality of cell contact plugs 841 to 847 (i.e., 840). The plurality of word lines 830 and the plurality of cell contact plugs 840 may be connected to each other in pads provided by at least a portion of the plurality of word lines 830 extending in different lengths in the second direction. A first metal layer 850*b* and a second metal layer 860*b* may be connected to an upper portion of the plurality of cell contact plugs 840 connected to the plurality of word lines 830, sequentially. The plurality of cell contact plugs 840 may be connected to the peripheral circuit region PERI by the upper bonding metals 871*b* and 872*b* of the cell region CELL and the lower bonding metals 771*b* and 772*b* of the peripheral circuit region PERI in the word line bonding area WLBA.

The cell contact plugs 840 may be electrically connected to the circuit elements 720*b* forming a row decoder 894 in the peripheral circuit region PERI. In an example embodiment, operating voltages of the circuit elements 720*b* of the row decoder 894 may be different than operating voltages of the circuit elements 720*c* forming the page buffer 893. For example, operating voltages of the circuit elements 720*c* forming the page buffer 893 may be greater than operating voltages of the circuit elements 720*b* forming the row decoder 894.

A common source line contact plug 880 may be disposed in the external pad bonding area PA. The common source line contact plug 880 may be formed of a conductive material such as a metal, a metal compound, polysilicon, or the like, and may be electrically connected to the common source line 820. A first metal layer 850*a* and a second metal layer 860*a* may be stacked on an upper portion of the common source line contact plug 880, sequentially. For example, an area in which the common source line contact plug 880, the first metal layer 850*a*, and the second metal layer 860*a* are disposed may be defined as the external pad bonding area PA.

Input/output pads 705 and 805 may be disposed in the external pad bonding area PA. Referring to FIG. 13, a lower insulating film 701 covering a lower surface of the first substrate 710 may be formed below the first substrate 710, and a first input/output pad 705 may be formed on the lower insulating film 701. The first input/output pad 705 may be connected to at least one of the plurality of circuit elements 720*a*, 720*b*, and 720*c* disposed in the peripheral circuit region PERI through a first input/output contact plug 703, and may be separated from the first substrate 710 by the lower insulating film 701. In addition, a side insulating film may be disposed between the first input/output contact plug 703 and the first substrate 710 to electrically separate the first input/output contact plug 703 and the first substrate 710.

Referring to FIG. 13, an upper insulating film 801 covering the upper surface of the second substrate 810 may be formed on the second substrate 810, and a second input/output pad 805 may be disposed on the upper insulating layer 801. The second input/output pad 805 may be connected to at least one of the plurality of circuit elements 720*a*, 720*b*, and 720*c* disposed in the peripheral circuit region PERI through a second input/output contact plug 803.

In some example embodiments, the second substrate 810 and the common source line 820 may not be disposed in a region in which the second input/output contact plug 803 is disposed. Also, the second input/output pad 805 may not overlap the word lines 830 in the third direction (the Z-axis direction). Referring to FIG. 13, the second input/output contact plug 803 may be separated from the second substrate 810 in a direction, parallel to the upper surface of the second substrate 810, and may pass through an interlayer insulating layer 815 of the cell region CELL to be connected to the second input/output pad 805.

In some example embodiments, the first input/output pad 705 and the second input/output pad 805 may be selectively formed. For example, the non-volatile device 600 may include only the first input/output pad 705 disposed on the first substrate 710, or may include only the second input/output pad 805 disposed on the second substrate 810. Alternatively, the non-volatile device 600 may include both the first input/output pad 705 and the second input/output pad 805.

A metal pattern provided on an uppermost metal layer may be provided as a dummy pattern or the uppermost metal layer may be absent, in each of the external pad bonding area PA and the bit line bonding area BLBA, respectively included in the cell region CELL and the peripheral circuit region PERI.

In the external pad bonding area PA, the non-volatile device 600 may include a lower metal pattern 773*a*, corresponding to an upper metal pattern 872*a* formed in an uppermost metal layer of the cell region CELL, and having the same cross-sectional shape as the upper metal pattern 872*a* of the cell region CELL so as to be connected to each other, in an uppermost metal layer of the peripheral circuit region PERI. In the peripheral circuit region PERI, the lower metal pattern 773*a* formed in the uppermost metal layer of the peripheral circuit region PERI may not be connected to a contact. Similarly, in the external pad bonding area PA, an upper metal pattern, corresponding to the lower metal pattern formed in an uppermost metal layer of the peripheral circuit region PERI, and having the same shape as the lower metal pattern of the peripheral circuit region PERI, may be formed in an uppermost metal layer of the cell region CELL.

The lower bonding metals 771*b* and 772*b* may be formed on the second metal layer 740*b* in the word line bonding area WLBA. In the word line bonding area WLBA, the lower bonding metals 771*b* and 772*b* of the peripheral circuit region PERI may be electrically connected to the upper bonding metals 871*b* and 872*b* of the cell region CELL by bonding.

Further, in the bit line bonding area BLBA, an upper metal pattern 892, corresponding to a lower metal pattern 752 formed in the uppermost metal layer of the peripheral circuit region PERI, and having the same cross-sectional shape as the lower metal pattern 752 of the peripheral circuit region PERI, may be formed in an uppermost metal layer of the cell region CELL. A contact may not be formed on the upper metal pattern 892 formed in the uppermost metal layer of the cell region CELL.

In the example embodiment, a reinforced metal pattern, corresponding to a metal pattern formed on the uppermost metal layer of one of the cell region CELL and the peripheral circuit region PERI, and having the same cross-sectional shape as a metal pattern formed on the uppermost metal layer of the other one of the cell region CELL and the peripheral circuit region PERI, may be formed. A contact may not be formed in the reinforced metal pattern.

According to an example embodiment, the non-volatile memory 600 may include user memory blocks capable of storing data of a user. The data of the user memory blocks may be permanently removed by a sanitize command from a host. In addition, whether the user memory blocks are erased or not in response to a block state check command from the host.

Figure 14:
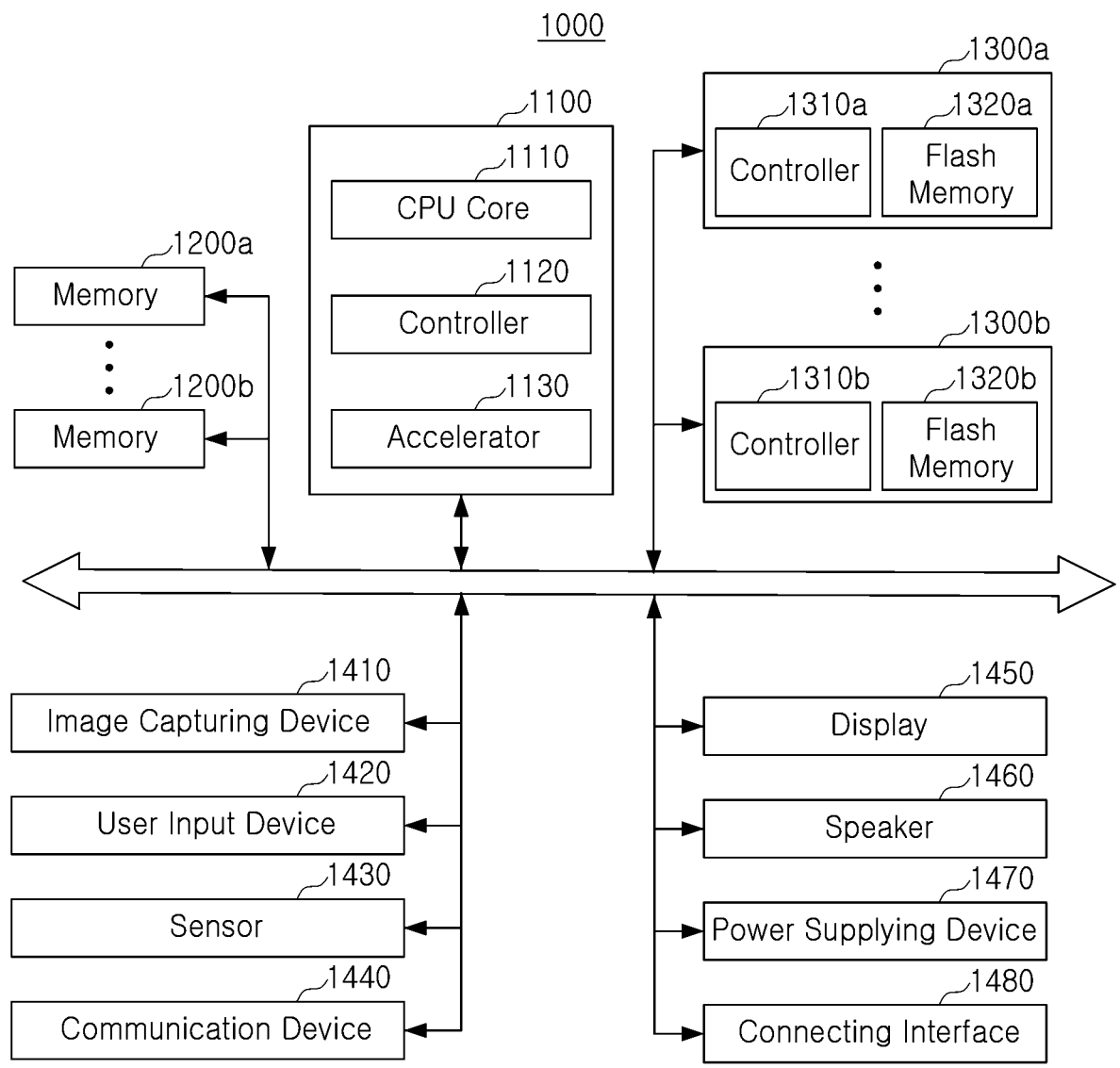
FIG. 14 is a view illustrating a system to which a storage device according to an example embodiment is applied.

FIG. 14 is a view illustrating a system 1000 to which a storage device according to an example embodiment is applied. The system 1000 of FIG. 14 may be basically a mobile system, such as a mobile phone, a smartphone, a tablet personal computer (PC), a wearable device, a healthcare device, or an internet-of-things (JOT) device. The system 1000 of FIG. 14 is not necessarily limited to the mobile system, and may be for a vehicle such as a personal computer, a laptop computer, a server, a media player, an automotive device such as a navigation system, or the like.

Referring to FIG. 14, the system 1000 may include a main processor 1100, memories 1200*a* and 1200*b*, and storage devices 1300*a* and 1300*b*, and may further include at least one of an image capturing device 1410, a user input device 1420, a sensor 1430, a communication device 1440, a display 1450, a speaker 1460, a power supplying device 1470, or a connecting interface 1480.

The main processor 1100 may control an overall operation of the system 1000, and more specifically, operations of other components constituting the system 1000. The main processor 1100 may be implemented as a general-purpose processor, a dedicated processor, an application processor, or the like.

The main processor 1100 may include at least one CPU core 1110 and may further include a controller 1120 for controlling the memories 1200a and 1200b and/or the storage devices 1300a and 1300b. According to an example embodiment, the main processor 1100 may further include an accelerator 1130 that may be a dedicated circuit for high-speed data operation such as artificial intelligence (AI) data operation. The accelerator 1130 may include a graphics processing unit (GPU), a neural processing unit (NPU), and/or a data processing unit (DPU), or the like, and may be implemented as a separate chip, physically independent from other components of the main processor 1100.

The memories 1200a and 1200b may be used as a main memory device of the system 1000, and may include volatile memories such as SRAM and/or DRAM, or the like, but may also include non-volatile memories such as flash memory, PRAM, and/or RRAM, or the like. The memories 1200a and 1200b may be implemented together with the main processor 1100 in the same package.

The storage devices 1300a and 1300b may function as non-volatile storage devices that store data regardless of whether power is supplied or not, and may have a relatively larger storage capacity, as compared to the memories 1200a and 1200b. The storage devices 1300a and 1300b may include storage controllers 1310a and 1310b, and non-volatile memories (NVM) 1320a and 1320b for storing data under control of the storage controllers 1310a and 1310b. The non-volatile memories 1320a and 1320b may include a flash memory having a 2D (2-dimensional) structure or a 3D (3-dimensional) vertical NAND (V-NAND) structure, but may include other types of non-volatile memory such as PRAM and/or RRAM, or the like.

The storage devices 1300a and 1300b may be included in the system 1000 in a state physically separated from the main processor 1100, or may be implemented together with the main processor 1100 in the same package. In addition, the storage devices 1300a and 1300b may have a shape such as a solid state device (SSD) or a memory card, to be detachably coupled to other components of the system 1000 through an interface such as a connecting interface 1480 to be described later. Such storage devices 1300a and 1300b may be devices to which standard protocols such as a universal flash storage (UFS), an embedded multi-media card (eMMC), or a non-volatile memory express (NVMe) are applied, but embodiments are not limited thereto.

According to an example embodiment, storage devices 1300a and 1300b may support a command that allows a host to check whether user memory blocks included therein are in an erase state after a sanitize command is executed. Therefore, even when a portion of a user data region provided by the user memory blocks of the storage devices 1300a and 1300b is not accessed using a logical address used by the host, the host may verify whether all store user data of the storage devices 1300a and 1300b have been removed or not.

The image capturing device 1410 may capture a still image or a moving image, and may be a camera, a camcorder, and/or a webcam, or the like.

The user input device 1420 may receive various types of data of the system 1000, input by a user, and may be a touch pad, a keypad, a keyboard, a mouse, and/or a microphone, or the like.

The sensor 1430 may detect various types of physical quantities that may be acquired from the outside of the system 1000, and may convert the sensed physical quantities into electrical signals. Such a sensor 1430 may be a temperature sensor, a pressure sensor, an illuminance sensor, a position sensor, an acceleration sensor, a biosensor, and/or a gyroscope sensor, or the like.

The communication device 1440 may transmit and receive signals between other devices outside the system 1000 according to various communication protocols. Such a communication device 1440 may be implemented to include an antenna, a transceiver, and/or a modem, or the like.

The display 1450 and the speaker 1460 may function as output devices that respectively output visual information and auditory information to the user of the system 1000.

The power supplying device 1470 may appropriately convert power supplied from a battery (not illustrated) mounted in the system 1000 and/or an external power source, and may supply the converted power to each of the components of the system 1000.

The connecting interface 1480 may provide a connection between the system 1000 and an external device that may be connected to the system 1000 and may exchange data with the system 1000. The connecting interface 1480 may be implemented in various interface methods such as an advanced technology attachment (ATA), a serial ATA (SATA), an external SATA (e-SATA), a small computer small interface (SCSI), a serial attached SCSI (SAS), a peripheral component interconnection (PCI), a PCI express (PCIe), NVMe, IEEE 1394, a universal serial bus (USB), a secure digital (SD) card, a multi-media card (MMC), an eMMC, a UFS, an embedded universal flash storage (eUFS), a compact flash (CF) card interface, or the like.

According to an example embodiment, configurations and operations related to a storage device supporting a sanitize operation may be provided.

According to an example embodiment, a storage device may provide a protocol by which a host may verify whether all user data stored in the storage device has actually been removed by providing information related to a physical address of a memory region therein to the host. Therefore, reliability of the user in security of the storage device may be improved.

Problems to be solved by the embodiments are not limited to the problems mentioned above, and other problems not mentioned will be clearly understood by those skilled in the art from the following description.

While example embodiments have been illustrated and described above, it will be apparent to those skilled in the art that modifications and variations could be made without departing from the scope of the embodiments as defined by the appended claims.

What is claimed is:

1. A storage device comprising:
  a memory device comprising user memory blocks providing a user data region; and
  a controller configured to:
   map logical addresses used in a host to a portion of the user data region, and
   use a remaining portion of the user data region as an over-provisioning region,
  wherein the controller is further configured to control the memory device to:
   erase the user memory blocks based on a sanitize command from the host,
   provide, to the host, block address information of the user memory blocks based on a block address request from the host, access the user memory blocks based on block state check requests from the host, and provide, to the host, state information indicating whether the user memory blocks are erased according to access results, wherein the memory device further comprises bad memory blocks, wherein the user memory blocks have non-contiguous physical block addresses by the bad memory blocks, and wherein the controller is further configured to map the non-contiguous physical block addresses of the user memory blocks to contiguous virtual block addresses.

2. The storage device of claim 1, wherein the block address information comprises number information of the user memory blocks, and the controller is further configured to sequentially provide, to the host, state information of each of the user memory blocks, based on the block state check requests provided from the host and the number information.

3. The storage device of claim 1, wherein the controller is further configured to:

map physical block addresses of the user memory blocks to virtual block addresses, and provide, to the host, the virtual block addresses as the block address information.

4. The storage device of claim 3, wherein the controller is further configured to map the physical block addresses to the virtual block addresses in a random order.

5. The storage device of claim 1, wherein the controller is further configured to sequentially provide, to the host, state information of each of the user memory blocks, based on block state check requests provided in an order of virtual block addresses provided by the host.

6. The storage device of claim 5, wherein the controller is not configured to map the over-provisioning region to a logical address, and to perform a garbage collection operation or a wear-leveling operation of a region mapped to the logical address using the over-provisioning region.

7. A storage device comprising:

a memory device comprising user memory blocks providing a user data region; and a controller, wherein the controller is configured to control the memory device to:

erase the user memory blocks based on a sanitize command from a host, map physical block addresses of the user memory blocks to virtual block addresses, provide, to the host, block address information based on: i) the virtual block addresses, and ii) a block address request from the host, access the user memory blocks based on block state check requests from the host, and provide, to the host, state information indicating whether the user memory blocks are erased according to access results, wherein the memory device further comprises bad memory blocks, wherein the user memory blocks have non-contiguous physical block addresses by the bad memory blocks, and wherein the controller is further configured to map the non-contiguous physical block addresses of the user memory blocks to contiguous virtual block addresses.

8. The storage device of claim 7, wherein the user data region comprises a region mapped to logical addresses of the host, and an over-provisioning region not mapped to the logical addresses of the host.

9. The storage device of claim 7, wherein the block address information comprises number information of the user memory blocks, and the controller is further configured to sequentially provide, to the host, state information of each of the user memory blocks, based on the block state check requests provided from the host and the number information.

10. The storage device of claim 9, wherein the controller is further configured to map the physical block addresses to the virtual block addresses in a random order.

11. The storage device of claim 7, wherein the controller is further configured to:

convert a virtual block address, received together with each block state check request from the host, into a physical block address, provide, to the memory device, a state check command together with the physical block address, and provide, to the host, state information indicating whether the user memory blocks, corresponding to the physical block address from the memory device, are erased.

12. A method of operating an electronic system including a host and a storage device, the method comprising:

providing, by the host, a sanitize command to the storage device;

providing, by the storage device, a completion response after the storage device performs an erase operation of user memory blocks included in the storage device based on the sanitize command;

requesting, by the host, block address information of the user memory blocks to the storage device;

providing, by the storage device, the block address information to the host based on the request;

providing, by the host, a state check request of a first user memory block, among the user memory blocks, with reference to the block address information;

providing, by the storage device, state information indicating whether the first user memory block is erased, based on the state check request from the host; and repeating, by the host, an operation of providing the state check request, until the host obtains state information of all of the user memory blocks, wherein the memory device further comprises bad memory blocks, wherein the user memory blocks have non-contiguous physical block addresses by the bad memory blocks, and wherein the method further comprises mapping the non-contiguous physical block addresses of the user memory blocks to contiguous virtual block addresses.

13. The method of claim 12, further comprising:

mapping, by the storage device, logical addresses used in the host to a portion of user data regions provided by the user memory blocks; and performing a garbage collection operation or a wear-leveling operation using a remaining portion of a user data region by the storage device.

14. The method of claim 12, wherein the providing the block address information to the host comprises providing number information of the user memory blocks.

15. The method of claim 12, further comprising:

randomly mapping, by the storage device, physical block addresses of the user memory blocks to virtual block addresses; and generating, by the storage device, the block address information based on the virtual block addresses.

16. The method of claim 15, further comprising providing, by the storage device, state information of each of the user memory blocks in an order of the virtual block addresses in response to state check requests repeatedly provided from the host.

* * * * *